US012447751B2

(12) United States Patent
Igarashi

(10) Patent No.: US 12,447,751 B2
(45) Date of Patent: Oct. 21, 2025

(54) LIQUID DISCHARGE APPARATUS, LIQUID EXCHANGE METHOD, AND RECORDING MEDIUM

(71) Applicant: Masanori Igarashi, Kanagawa (JP)

(72) Inventor: Masanori Igarashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 181 days.

(21) Appl. No.: 18/522,840

(22) Filed: Nov. 29, 2023

(65) Prior Publication Data

US 2024/0198685 A1 Jun. 20, 2024

(30) Foreign Application Priority Data

Dec. 14, 2022 (JP) ................................ 2022-199324
Jun. 26, 2023 (JP) ................................ 2023-104367

(51) Int. Cl.
*B41J 2/175* (2006.01)
*B41J 2/165* (2006.01)
*B41J 29/17* (2006.01)

(52) U.S. Cl.
CPC ....... *B41J 2/17543* (2013.01); *B41J 2/16552* (2013.01); *B41J 2/1752* (2013.01); *B41J 29/17* (2013.01); *B41P 2235/00* (2013.01)

(58) Field of Classification Search
CPC ......................... B41J 2/17543; B41J 2/17506; B41J 2/17509; B41J 2/16552; B41J 2/1752; B41J 29/17; B41J 2/17503; B41J 2/17513; B41J 2/17523; B41J 2/17526; B41J 2/17546;
(Continued)

(56) References Cited

U.S. PATENT DOCUMENTS 6,142,600 A 11/2000 Takahashi et al.
2005/0128239 A1* 6/2005 Tanaka ................ B41J 2/17566 347/19
2011/0057998 A1 3/2011 Igarashi
(Continued)

FOREIGN PATENT DOCUMENTS

EP 2100738 B1 * 11/2010 .......... B41J 2/17566
GB 2334790 * 9/1999 ............ B41J 2/1755
(Continued)

OTHER PUBLICATIONS

Extended European Search Report dated May 14, 2024, received for European Patent Application No. 23213012.0.

*Primary Examiner* — Kristal Feggins
(74) *Attorney, Agent, or Firm* — IPUSA, PLLC

(57) ABSTRACT

A liquid discharge apparatus includes: a discharge unit to discharge a liquid; multiple liquid containers to contain the liquid having an identical color to each other; multiple insertion ports to which the multiple liquid containers are respectively detachably attachable; an acquisition unit to acquire information of the multiple liquid containers attached to the multiple insertion ports; a display; and circuitry configured to: in response to an acquisition of the information of the multiple liquid containers containing the liquid of identical color of different versions by the acquisition unit, cause the display to display information prompting an exchange of a liquid container containing the different versions to a liquid container containing the liquid having an identical color of an identical version to other of the multiple liquid containers.

11 Claims, 12 Drawing Sheets

(58) Field of Classification Search
CPC .. B41J 2/17553; B41J 2/1755; B41J 2/17556; B41P 2235/00
See application file for complete search history.

(56) References Cited

U.S. PATENT DOCUMENTS

| | | | |
|---|---|---|---|
| 2011/0221801 | A1 | 9/2011 | Igarashi |
| 2012/0007903 | A1 | 1/2012 | Igarashi |
| 2012/0306950 | A1 | 12/2012 | Kobayashi et al. |
| 2013/0321501 | A1 | 12/2013 | Igarashi |
| 2017/0165971 | A1 | 6/2017 | Igarashi |
| 2020/0238707 | A1 | 7/2020 | Igarashi |

FOREIGN PATENT DOCUMENTS

| | | | |
|---|---|---|---|
| JP | 2001-187458 | | 7/2001 |
| JP | 2001-219579 | A | 8/2001 |
| JP | 2012-025822 | A | 2/2012 |
| JP | 2015-096613 | A | 5/2015 |
| JP | 2020-082353 | A | 6/2020 |
| JP | 2021-112910 | A | 8/2021 |

* cited by examiner

LIQUID DISCHARGE APPARATUS, LIQUID EXCHANGE METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2022-199324, filed on Dec. 14, 2022, in the Japan Patent Office, and Japanese Patent Application No. 2023-104367, filed on Jun. 26, 2023, in the Japan Patent Office, the entire disclosure of which is hereby incorporated by reference herein.

BACKGROUND

Technical Field

The present disclosure relates to a liquid discharge apparatus, a liquid exchange method, and a recording medium.

Related Art

A liquid discharge apparatus discharges liquid. In addition, a liquid exchange method for exchanging liquid in a liquid discharge apparatus and a program causes a computer of the liquid discharge apparatus to execute the liquid exchange method.

An inkjet printer includes a switching unit that can select an arbitrary supply unit from among an ink supply unit and a cleaning medium supply unit. The cleaning medium supply unit substitutes ink in a print head unit with a cleaning liquid according to a type of ink.

SUMMARY

In an aspect of the present disclosure, a liquid discharge apparatus includes: a discharge unit to discharge a liquid; multiple liquid containers to contain the liquid having an identical color to each other; multiple insertion ports to which the multiple liquid containers are respectively detachably attachable; an acquisition unit to acquire information of the multiple liquid containers attached to the multiple insertion ports; a display; and circuitry configured to: in response to an acquisition of the information of the multiple liquid containers containing the liquid of identical color of different versions by the acquisition unit, cause the display to display information prompting an exchange of a liquid container containing the different versions to a liquid container containing the liquid having an identical color of an identical version to other of the multiple liquid containers.

In another aspect of the present disclosure, a liquid discharge method includes: discharging a liquid; acquiring information of multiple liquid containers each containing a liquid having an identical color to each other; and in response to an acquisition of the information of the multiple liquid containers containing the liquid of identical color of different versions by the acquiring, displaying information prompting an exchange of a liquid container containing the different versions to a liquid container containing the liquid having an identical color of an identical version to other of the multiple liquid containers.

In further another aspect of the present disclosure, a non-transitory recording medium storing program codes which, when executed by one or more processors, cause the one or more processors to perform a method, the method includes: discharging a liquid; acquiring information of multiple liquid containers each containing a liquid having an identical color to each other; and in response to an acquisition of the information of the multiple liquid containers containing the liquid of identical color of different versions by the acquiring, displaying information prompting an exchange of a liquid container containing the different versions to a liquid container containing the liquid having an identical color of an identical version to other of the multiple liquid containers.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
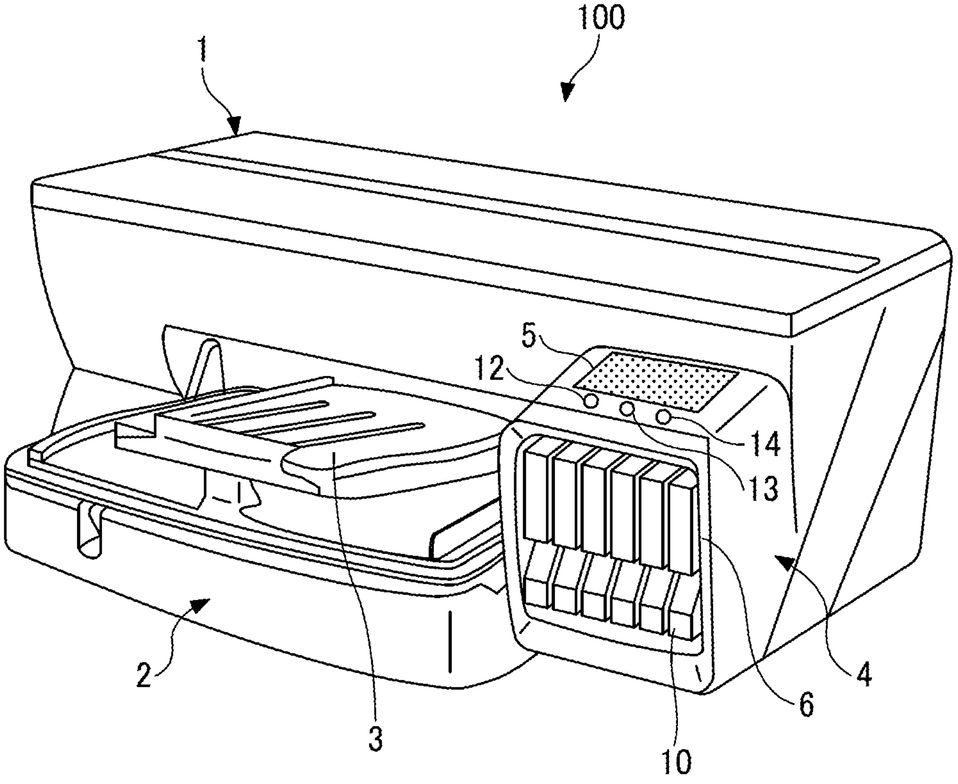
FIG. 1 is a perspective view of a liquid discharge apparatus according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments of the present disclosure will be described in detail with reference to the drawings. In the drawings, the same components are denoted by the same reference numerals, and redundant description will be omitted as appropriate.

General Arrangement of Liquid Discharge Apparatus

FIG. 1 is a perspective view of a liquid discharge apparatus according to an embodiment. An inkjet printer 100, which is an example of a liquid discharge apparatus, includes an apparatus body 1, a supply tray 2 attached to the apparatus body 1 and loaded with a recording medium such as paper, and a discharge tray 3 detachably attached to the apparatus body 1 and on which the recording medium is loaded on which an image is formed.

The apparatus body 1 is provided with six cartridge insertion ports 4 into which six ink cartridges 10 are inserted. The ink cartridge 10 is an example of a liquid container, and the cartridge insertion port 4 is an example of an insertion port into which the liquid container is inserted.

Two ink cartridges 10 containing inks having an identical color are inserted into two of the six cartridge insertion ports 4. The ink cartridge 10 containing a first white (W1) ink and the ink cartridge 10 containing a second white (W2) ink can be inserted into the two cartridge insertion ports 4. The two ink cartridges 10 preferably contain the white ink of the same version produced using the same material.

Further, four ink cartridges 10 containing ink of any one of black (K), cyan (C), magenta (M), and yellow (Y) are inserted into the remaining four cartridge insertion ports 4 among the six cartridge insertion ports 4, respectively.

Instead of the six ink cartridges 10, six cleaner cartridges containing a cleaning liquid corresponding to any one of W1, W2, K, C, M, and Y can be inserted into the six cartridge insertion ports 4. The ink cartridge 10 and the cleaner cartridge are examples of liquid containers.

The six ink cartridges 10 are inserted into the six cartridge insertion ports 4 arranged in the lateral direction in the vertical state. On the front surface of the cartridge insertion port 4, a cartridge cover 6 may be provided to be opened and closed so as to open and close when the ink cartridge 10 is attached and detached.

On the front surface of the apparatus body 1, an operation panel 5, which is an example of an output unit, is provided. The operation panel 5 includes at least one of a touch panel display and a speaker. The operation panel 5 outputs various types of information and receives an input from the user.

The touch panel display of the operation panel 5 displays various types of information such as the remaining amount of ink in the ink cartridge 10 and guidance for prompting exchange of the ink cartridge 10.

Similarly, the speaker of the operation panel 5 outputs various types of information such as the remaining amount of ink in the ink cartridge 10 and guidance for prompting exchange of the ink cartridge 10 by voice.

A power button 12, a recording medium discharge/print restart button 13, a cancel button 14, and the like of the inkjet printer 100 are arranged below the operation panel 5.

Mechanism Unit of Liquid Discharge Apparatus

Figure 2:
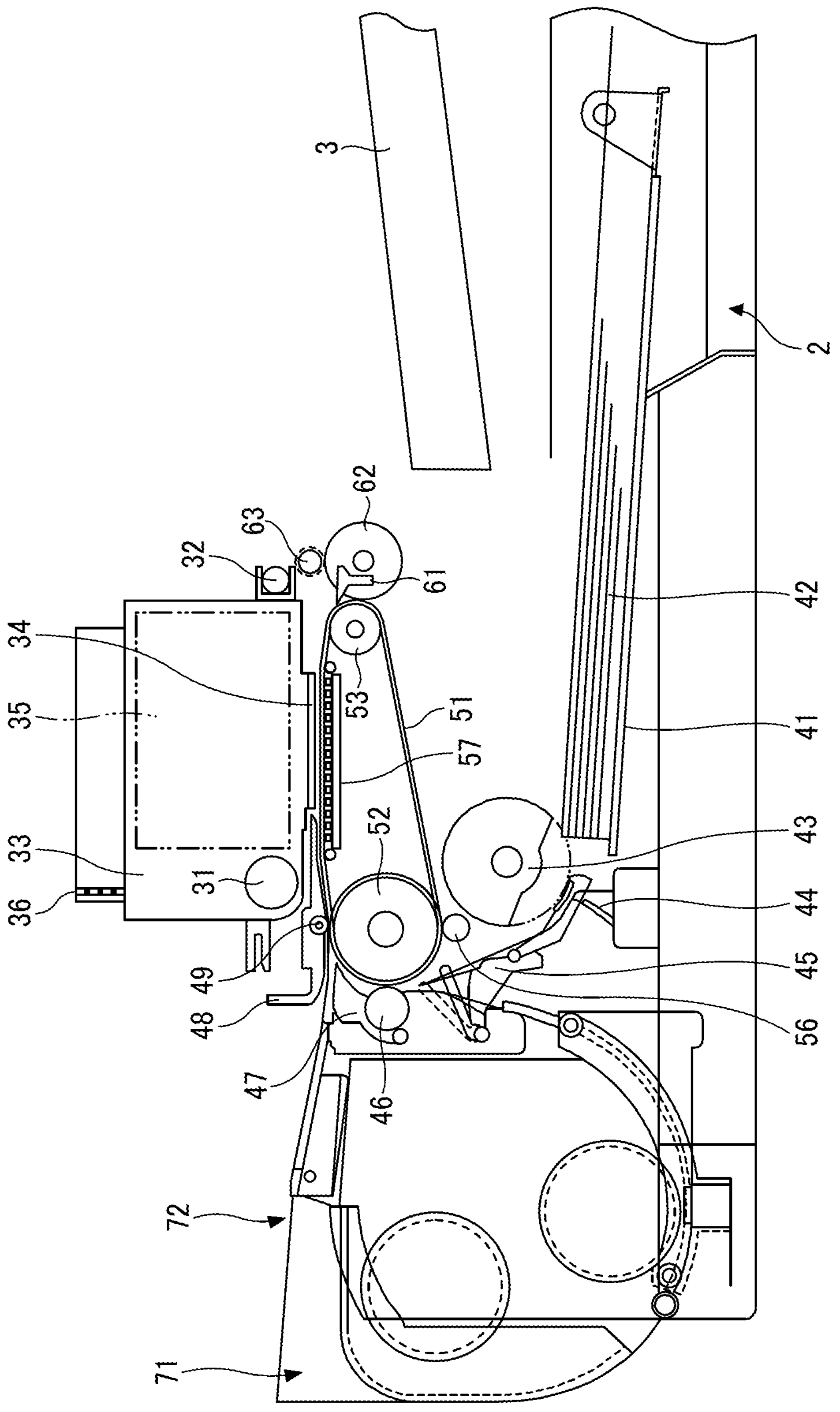
FIG. 2 is a side view of a mechanism unit of the liquid discharge apparatus according to an embodiment.

Next, a mechanism unit of the inkjet printer 100 will be described with reference to FIGS. 2 and 3. FIG. 2 is a side view of a mechanism unit of the liquid discharge apparatus according to the embodiment, and FIG. 3 is a plan view of the mechanism unit of the liquid discharge apparatus according to the embodiment.

Figure 3:
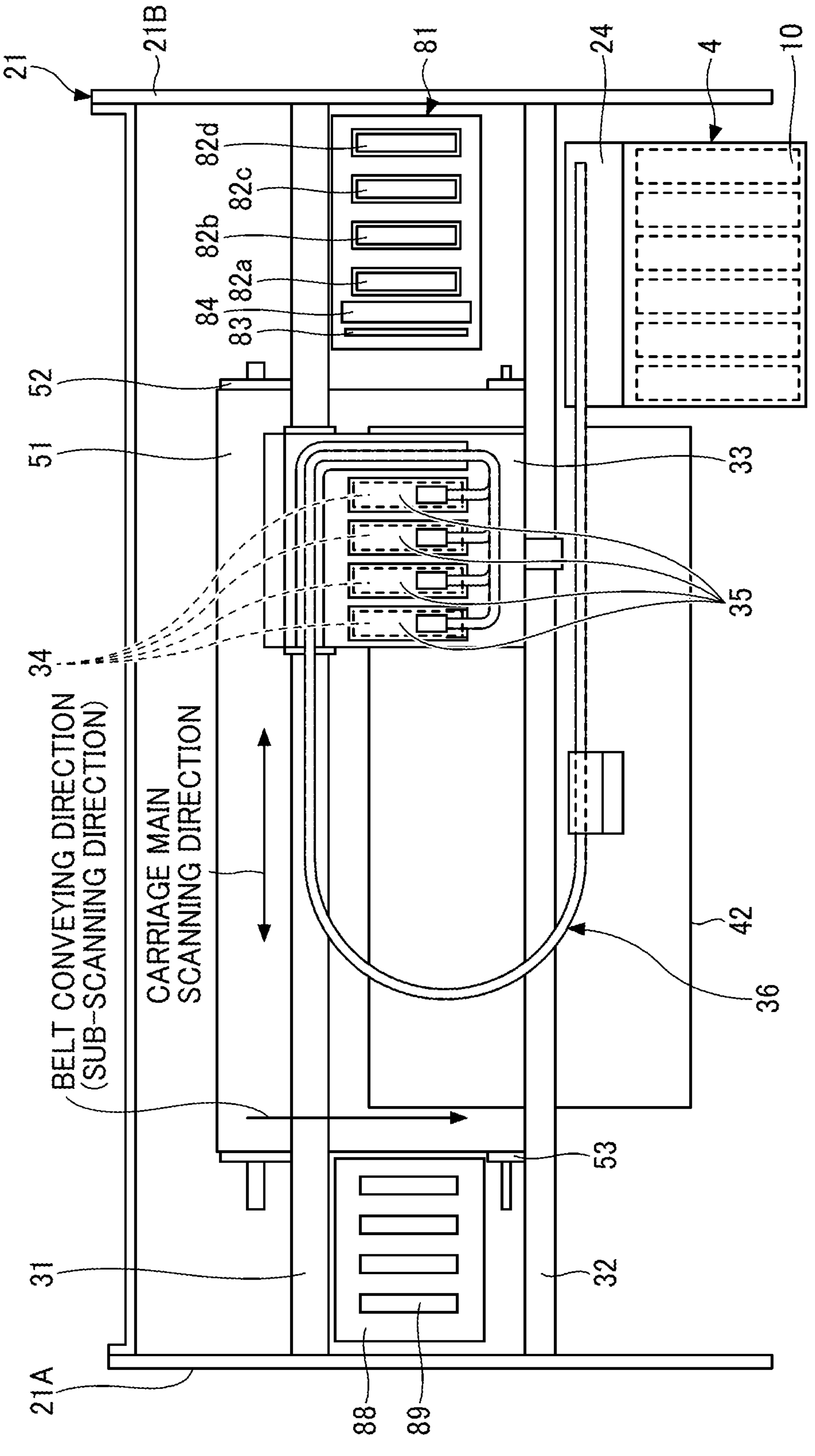
FIG. 3 is a plan view of the mechanism unit of the liquid discharge apparatus according to an embodiment.

As illustrated in FIG. 3, the mechanism unit of the inkjet printer 100 is provided with a left side plate 21A and a right side plate 21B constituting the frame 21, and a guide rod 31 and a stay 32 laterally bridged between the left side plate 21A and the right side plate 21B. The guide rod 31 and the stay 32 slidably hold the carriage 33 in the main scanning direction that is a direction orthogonal to the conveying direction of the recording medium 42. The carriage 33 is moved in the main scanning direction by a main scanning motor via a timing belt.

In the carriage 33, four liquid discharge heads 34 as an example of a discharge unit are provided with nozzle surfaces facing downward. The inkjet printer 100 is a serial type inkjet printer that discharges ink while the liquid discharge head 34 moves in the main scanning direction to form an image. The inkjet printer 100 may be a line type inkjet printer in which the liquid discharge head 34 does not move in the main scanning direction.

Each liquid discharge heads 34 is provided with, in the main scanning direction, multiple nozzle rows in which multiple nozzles for discharging ink is arranged in the conveying direction of the recording medium 42. Each liquid discharge head 34 is provided with a drive element such as a piezoelectric element for each nozzle.

In the carriage 33, six head tanks 35 supplying ink to the respective liquid discharge heads 34 are mounted. The six head tanks 35 are each supplied with ink from the six ink cartridges 10 via six liquid supply tubes 36 through six liquid feeding pumps. Note that instead of the six head tanks 35, the six ink cartridges 10 or the six cleaner cartridges may be inserted into the carriage 33.

As illustrated in FIG. 2, the mechanism unit of the inkjet printer 100 is provided with, as a supply unit of the recording medium 42, a semicircular supply roller 43 that separates and conveys the recording medium 42 stacked on the pressure plate 41 of the supply tray 2 one by one, and a separation pad 44 that faces the supply roller 43. The separation pad 44 is formed of a material having a large friction coefficient, and is biased toward the supply roller 43.

The mechanism unit of the inkjet printer 100 is provided with, as a conveyance unit of the recording medium 42, a first guide member 45 that guides the recording medium 42, a counter roller 46, a second guide member 47, and a pressing member 48 that has a pressure roller 49. Furthermore, as a conveyance unit of the recording medium 42, a conveyance belt 51 that conveys the recording medium 42 to a position facing the nozzle surface of the liquid discharge head 34 is provided.

The conveyance belt 51 is an endless belt stretched between a conveyance roller 52 and a tension roller 53. On the front side of the conveyance belt 51, a charging roller 56 that charges the surface of the conveyance belt 51 is provided. The charging roller 56 contacts a surface layer of the conveyance belt 51 and rotates according to a rotation of the conveyance belt 51. On the back side of the conveyance belt 51, a third guide member 57 is disposed in a region corresponding to the printing region of the liquid discharge head 34.

When the conveyance roller 52 is rotationally driven by the sub-scanning motor, the conveyance belt 51 moves in the sub-scanning direction, which is the conveying direction of the recording medium 42, and circulates.

Furthermore, the mechanism unit of the inkjet printer 100 is provided with, as a discharge unit of the recording medium 42 recorded by the liquid discharge head 34, a separation claw 61 that separates the recording medium 42 from the conveyance belt 51, a discharge roller 62, and a discharge roller 63. A discharge tray 3 is provided below the discharge roller 62.

A double-sided unit 71 may be detachably attached to the back side of the apparatus body 1. The double-sided unit 71 takes in and reverses the recording medium 42 returned by the backward rotation of the conveyance belt 51, and supplies the recording medium 42 between the counter roller 46 and the conveyance belt 51. A manual sheet feeding tray 72 may be provided on the upper surface of the double-sided unit 71.

As illustrated in FIG. 3, a maintenance and recovery mechanism 81 that maintains the state of the nozzle of the liquid discharge head 34 and sucks and recovers the nozzle is disposed in a non-printing region on one side in the main scanning direction of the carriage 33.

The maintenance and recovery mechanism 81 includes multiple cap members 82 that caps the nozzle surface of the liquid discharge head 34, a wiper blade 83 that wipes the nozzle surface, and a first idle discharge receiver 84 that receives liquid such as thickening ink discharged by performing idle discharge.

A first cap member 82*a* is a cap member for suction and moisture retention. A second cap member 82*b*, a third cap member 82*c*, and a fourth cap member 82*d* are cap members for moisture retention.

The waste liquid such as ink sucked by the suction recovery operation by the maintenance and recovery mechanism 81 is discharged and contained in the waste liquid tank. For example, the liquid discharged to the cap member 82, the liquid attached to the wiper blade 83 and removed by the wiper cleaner, and the liquid dummy-discharged to the first idle discharge receiver 84 are discharged to the waste liquid tank 23.

In a non-printing region on the other side in the main scanning direction of the carriage 33, a second idle discharge receiver 88 that receives liquid such as thickening ink discharged by performing idle discharge during recording on the recording medium 42 is disposed. The second idle discharge receiver 88 is provided with four openings 89 extending along the nozzle row of the liquid discharge head 34.

In the inkjet printer 100 configured as described above, as illustrated in FIG. 2, the recording medium 42 is separated and supplied one by one from the supply tray 2, and the recording medium 42 supplied upward is guided by the first guide member 45. Then, the recording medium 42 is conveyed while being sandwiched between the conveyance belt 51 and the counter roller 46, guided by the second guide member 47, pressed against the conveyance belt 51 by the pressure roller 49, and conveyed downward of the liquid discharge head 34 by the conveyance belt 51.

At this time, an alternating voltage that alternately repeats positively and negatively is applied to the charging roller 56. By the charging roller 56, the conveyance belt 51 is alternately charged positively and negatively with a predetermined width in the sub-scanning direction which is the conveying direction of the recording medium 42. When the recording medium 42 is conveyed on the conveyance belt 51 alternately charged positively and negatively, the recording medium 42 is electrostatically adsorbed to the conveyance belt 51, and the recording medium 42 is conveyed in the sub-scanning direction by the circular movement of the conveyance belt 51.

Next, the liquid discharge head 34 is driven according to an image signal while the carriage 33 moves in the main scanning direction orthogonal to the conveying direction of the recording medium 42. The liquid discharge head 34 discharges ink onto the recording medium 42 stopped on the conveyance belt 51 to record one row, and after the recording medium 42 is conveyed by a predetermined amount by the conveyance belt 51, records the next row. The liquid discharge head 34 ends the recording operation in response to a recording end signal or a signal indicating that the rear end of the recording medium 42 has reached a predetermined position, and the recording medium 42 is discharged to the discharge tray 3.

Furthermore, during the standby, the carriage 33 is moved to the maintenance and recovery mechanism 81, the liquid discharge head 34 is capped by the cap member 82, and the discharge failure due to ink drying is prevented by keeping the nozzle in the wet state. Further, the ink is sucked from the nozzle by the suction pump in a state where the liquid discharge head 34 is capped by the cap member 82, and a suction recovery operation of discharging the thickening ink or air bubbles is performed. Furthermore, before the start of recording and during recording, an idle discharge operation of discharging ink not related to recording is performed. As described above, stable discharging performance of the liquid discharge head 34 is maintained.

Controller of Liquid Discharge Apparatus

Figure 4:
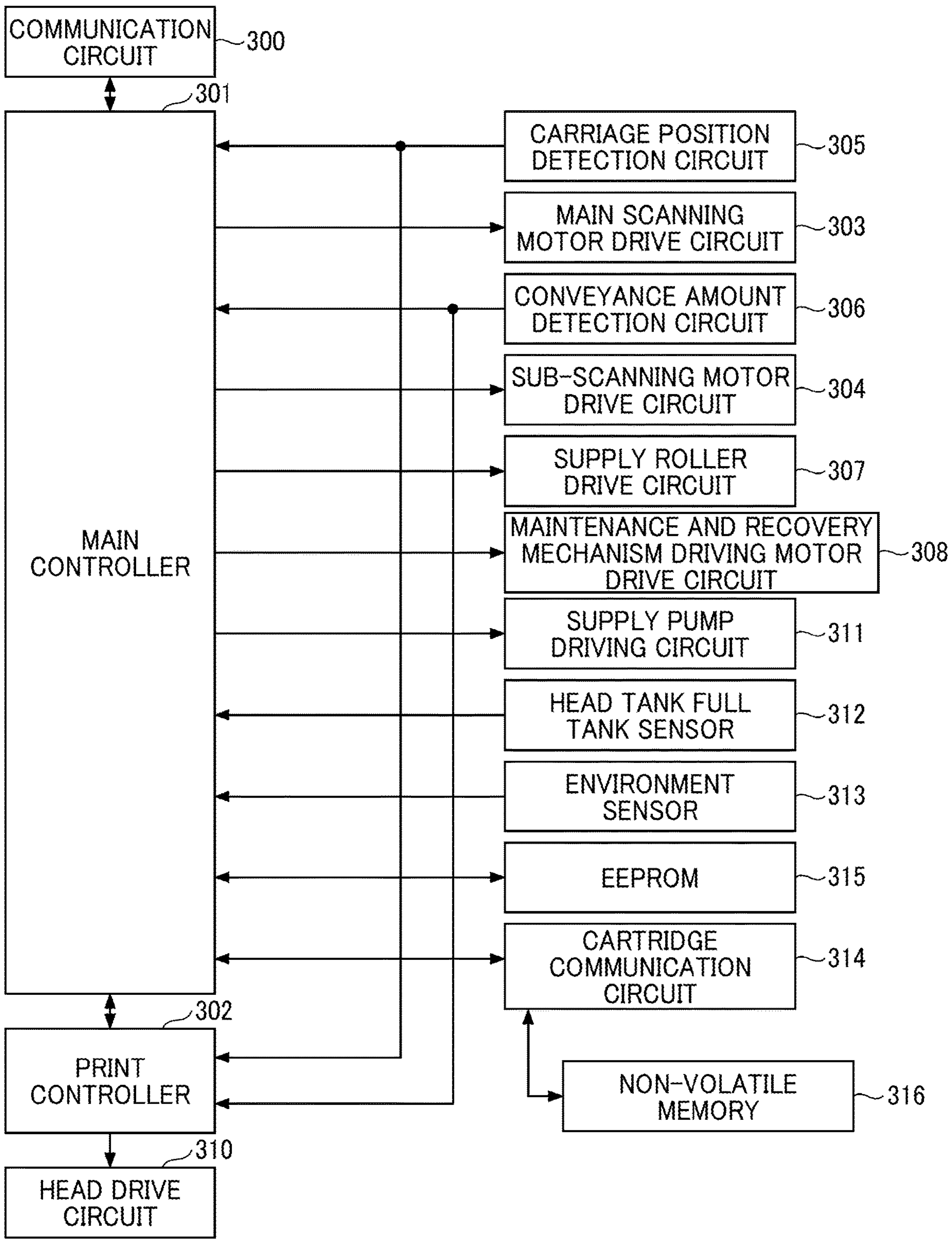
FIG. 4 is a block diagram of a controller of the liquid discharge apparatus according to an embodiment.

FIG. 4 is a block diagram of a controller of the liquid discharge apparatus according to an embodiment. The controller includes a main controller 301 that controls the entire inkjet printer 100 and a print controller 302 that controls printing. The main controller 301 and the print controller 302 include one or more microcomputers. The main controller 301 and the print controller 302 include a central processing unit (CPU), a read only memory (ROM), a random access memory (RAM), and the like.

The main controller 301 controls conveyance of the recording medium 42 on the basis of image data input from a communication circuit 300. For example, the main controller 301 drives and controls the main scanning motor via a main scanning motor drive circuit 303 to move the carriage 33 in the main scanning direction. Furthermore, the main controller 301 drives and controls the sub-scanning motor via a sub-scanning motor drive circuit 304 to convey the recording medium 42 in the sub-scanning direction. Further, the main controller 301 sends print image data obtained by performing image processing on the image data to the print controller 302.

A carriage detection signal is input to the main controller 301 from a carriage position detection circuit 305 that detects a movement amount of the carriage 33. The main controller 301 controls a movement amount such as a movement position and a movement speed of the carriage 33 based on the carriage detection signal. The carriage position detection circuit 305 detects the position of the carriage 33 by, for example, reading and counting the number of slits of the encoder sheet arranged in the main scanning direction of the carriage 33 with a photosensor mounted on the carriage 33. The main scanning motor drive circuit 303 rotationally drives the main scanning motor in accordance with the movement amount of the carriage 33 input from the main controller 301 to move the carriage 33 to a predetermined position at a predetermined speed.

A conveyance belt detection signal is input to the main controller 301 from a conveyance amount detection circuit 306 that detects the conveyance amount of the conveyance belt 51. The main controller 301 controls the conveyance amount such as the conveyance position and the conveyance speed of the conveyance belt 51 based on the conveyance belt detection signal. The conveyance amount detection circuit 306 detects the conveyance amount of the conveyance belt 51 by, for example, reading and counting the number of slits of the encoder sheet attached to the rotation shaft of the conveyance roller 52 with a photosensor. The sub-scanning motor drive circuit 304 rotationally drives the sub-scanning motor according to the conveyance amount of the conveyance belt 51 input from the main controller 301 to rotationally drive the conveyance roller 52 to move the conveyance belt 51 to a predetermined position at a predetermined speed.

The main controller 301 gives a supply roller drive command to a supply roller drive circuit 307 to rotate the supply roller 43 once. In addition, the main controller 301 controls lifting and lowering of the cap member 82, lifting and lowering of the wiper blade 83, driving of the suction pump, and the like by rotationally driving the motor of the maintenance and recovery mechanism 81 via a maintenance and recovery mechanism driving motor drive circuit 308.

Furthermore, the main controller 301 controls the pump driving motor of the liquid feeding pump via the supply pump driving circuit 311 to fill the six head tanks 35 with ink from the six ink cartridges 10 inserted into the six cartridge insertion ports 4. The main controller 301 acquires a full tank detection signal from a head tank full tank sensor 312 that detects that the head tank 35 is full, and controls the filling operation based on the full tank detection signal. The filling operation includes atmosphere open filling in which filling is performed with the atmosphere release valve of the head tank 35 being opened, normal filling in which filling is performed with the atmosphere release valve being closed, and the like.

Furthermore, the main controller 301 acquires information on the six ink cartridges 10 from six non-volatile memories 316 provided in the six ink cartridges 10 inserted into the six cartridge insertion ports 4 via a cartridge communication circuit 314. The cartridge communication circuit 314 is an example of an acquisition unit that acquires information on the liquid container.

The main controller 301 performs predetermined processing on the basis of the acquired information on the ink cartridge 10, and stores various types of information in the non-volatile memory 316. Note that the main controller 301 may acquire information on the ink cartridge 10 from an external device that can communicate with the inkjet printer 100 via the communication circuit 300 instead of the cartridge communication circuit 314. That is, the communication circuit 300 is also an example of an acquisition unit that acquires information on the liquid container.

The non-volatile memory 316 includes, for example, a cartridge electrically erasable programmable ROM (EEPROM). The non-volatile memory 316 stores information on the ink cartridge 10, such as a product name, a color of ink, a capacity of ink, a remaining amount of ink, and a type code of ink of the ink cartridge 10. Note that the type code of the ink includes information on the version of the ink. The non-volatile memory 316 is an example of a storage unit.

Further, an environment detection signal from an environment sensor 313 that detects an environmental temperature, an environmental humidity, and the like is input to the main controller 301. The main controller 301 controls the operation of the maintenance and recovery mechanism 81 according to the environment detection signal.

In response to a command from the main controller 301, the print controller 302 generates a discharge timing signal of each nozzle row of the liquid discharge head 34 based on the carriage detection signal from the carriage position detection circuit 305 and the conveyance belt detection signal from the conveyance amount detection circuit 306. Based on the discharge timing signal and the waveform data corresponding to the droplet size stored in the waveform data storage unit such as the ROM, the print controller 302 generates a common drive waveform including drive pulses corresponding to multiple droplet sizes, and sends the common drive waveform to the head drive circuit 310.

In addition, the print controller 302 generates a waveform selection signal for selecting a drive pulse corresponding to the droplet size or the like from the common drive waveform based on the print image data from the main controller 301, and sends the waveform selection signal to the head drive circuit 310. Further, the print controller 302 sends the print image data and the like to the head drive circuit 310.

The head drive circuit 310 receives the print image data, the waveform selection signal, the common drive waveform, and the like from the print controller 302. The head drive circuit 310 selects a drive pulse corresponding to the droplet size or the like from the common drive waveform based on the print image data and the waveform selection signal, and applies the selected drive pulse to a drive element such as a piezoelectric element of each nozzle of the liquid discharge head 34. The drive element of each nozzle of the liquid discharge head 34 is driven according to the selected drive waveform to discharge the liquid from the nozzle.

When the print controller 302 generates the waveform selection signal for selecting the drive pulse corresponding to the droplet size or the like from the common drive waveform, each nozzle of the liquid discharge head 34 can separate droplets having different sizes such as large droplets, medium droplets, and small droplets.

Liquid Discharge Unit of Liquid Discharge Apparatus

Figure 5:
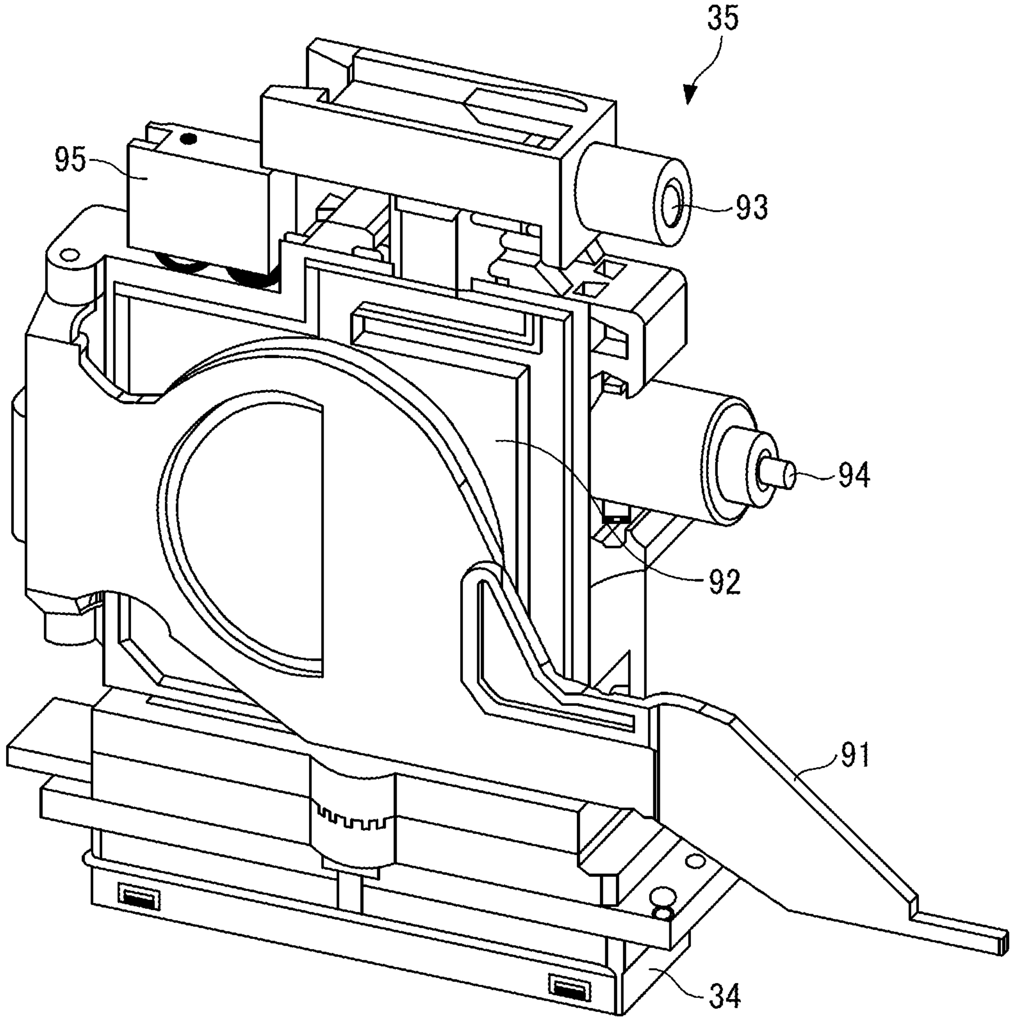
FIG. 5 is a perspective view of a liquid discharge unit of the liquid discharge apparatus according to an embodiment.

FIG. 5 is a perspective view of a liquid discharge unit of the liquid discharge apparatus according to an embodiment. The head tank 35 is provided with a negative pressure lever 91, a film 92, a supply port 93, an atmosphere release valve 94, a liquid level detection mechanism 95, and the like. The negative pressure lever 91 is a lever that operates following the film 92. The film 92 is biased by a spring to generate a negative pressure, and is displaced according to the consumption amount of ink contained in the head tank 35.

The supply port 93 is a supply port to which ink is supplied from the ink cartridge 10 through the liquid supply tube 36. The atmosphere release valve 94 is a pin that opens the inside of the head tank 35 to an atmospheric pressure state as necessary. The liquid discharge head 34 that discharges liquid such as ink is attached below the head tank 35. The liquid level detection mechanism 95 is an electrode pin that detects ink in the head tank 35, and constitutes the head tank full tank sensor 312.

Liquid Suction Mechanism of Liquid Discharge Apparatus

Figure 6:
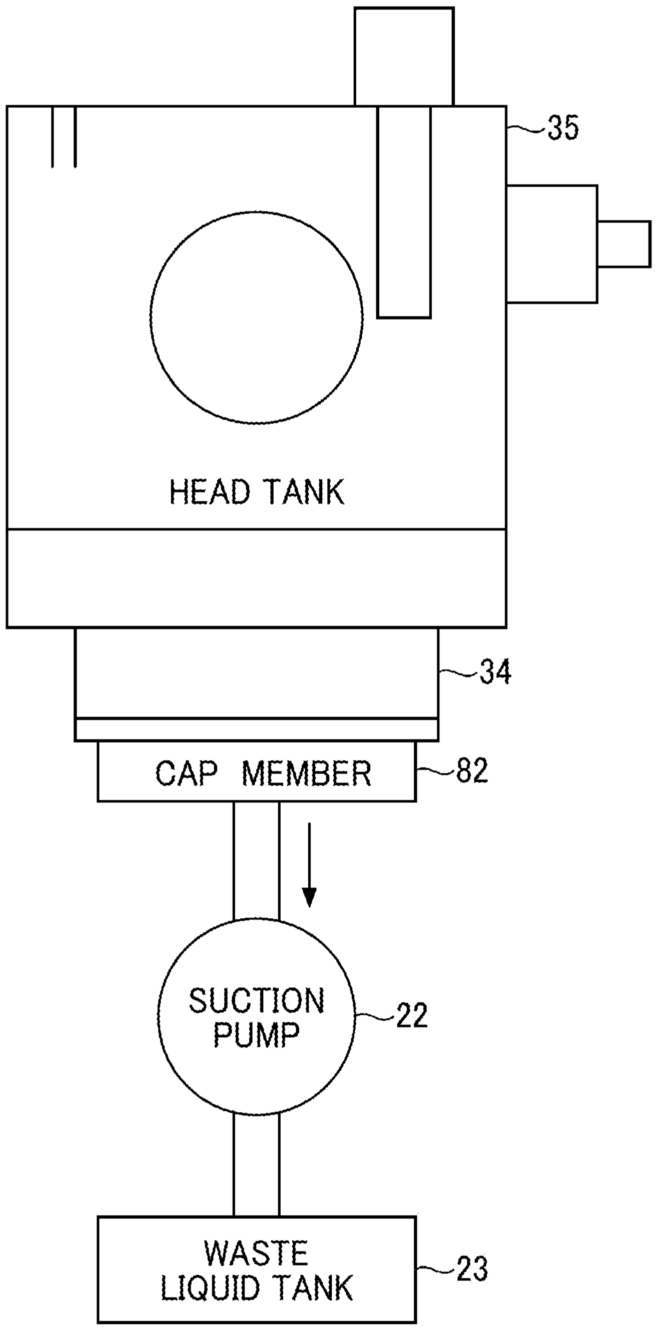
FIG. 6 is a configuration diagram of a liquid suction mechanism of the liquid discharge apparatus according to an embodiment.

FIG. 6 is a configuration diagram of a liquid suction mechanism of the liquid discharge apparatus according to an embodiment. The liquid suction mechanism includes a head tank 35, a liquid discharge head 34, a cap member 82, a suction pump 22, a waste liquid tank 23, and the like. The liquid suction mechanism covers the nozzle surface of the liquid discharge head 34 with the cap member 82 and performs suction with the suction pump 22 (referred to as "head suction") to discharge the ink in the head tank 35 to the waste liquid tank 23. By such head suction, the thickening ink and the like of the nozzle can be removed.

At this time, the liquid suction mechanism can lower the pressure in the head tank 35 to create a negative pressure by closing the negative pressure lever 91 to block the head tank 35 from the atmosphere, and performing head suction. On the other hand, the liquid suction mechanism can lower the liquid level in the head tank 35 by opening the negative pressure lever 91 to open the head tank 35 to the atmosphere, while performing head suction.

Liquid Supply Mechanism of Liquid Discharge Apparatus

Figure 7:
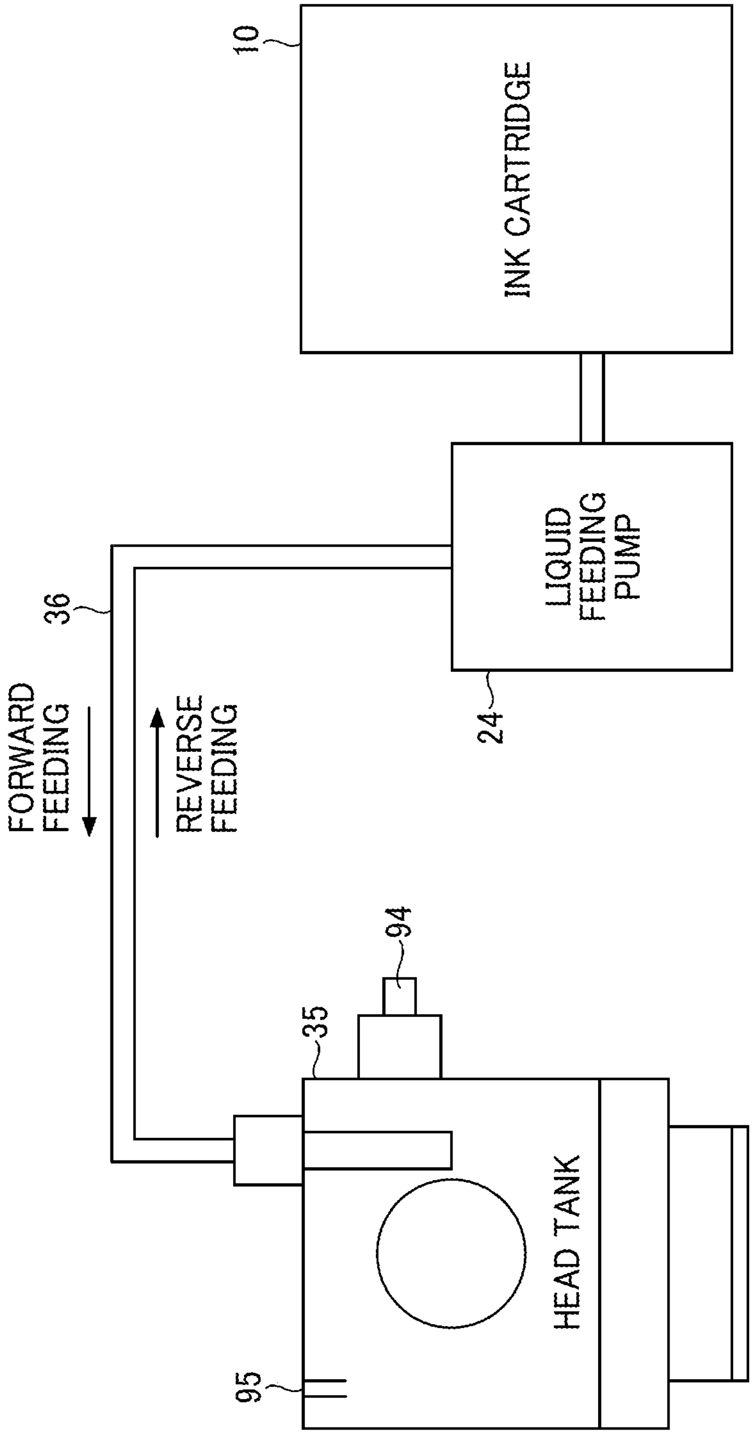
FIG. 7 is a configuration diagram of the liquid supply mechanism of the liquid discharge apparatus according to an embodiment.

FIG. 7 is a configuration diagram of a liquid supply mechanism of the liquid discharge apparatus according to an embodiment. The liquid supply mechanism includes an ink cartridge 10, a liquid feeding pump 24, a liquid supply tube 36, a head tank 35, an atmosphere release valve 94, a liquid level detection mechanism 95, and the like. The liquid feeding pump 24 feeds ink forward or backward between the head tank 35 and the ink cartridge 10. The liquid feeding pump 24 feeds liquid from the ink cartridge 10 to the head tank 35 (forward feeding) at the time of forward rotation, and returns liquid from the head tank 35 to the ink cartridge 10 at the time of backward rotation.

The liquid supply mechanism performs the forward feeding by the liquid feeding pump 24 while opening the head tank 35 to the atmosphere via the atmosphere release valve 94, and detects the liquid level in the head tank 35 by the liquid level detection mechanism 95. The liquid supply mechanism stops the liquid feeding pump 24 when the liquid level detection mechanism 95 detects the liquid level so that the head tank 35 is filled with the ink.

Liquid Feeding Pump of Liquid Discharge Apparatus

Figure 8:
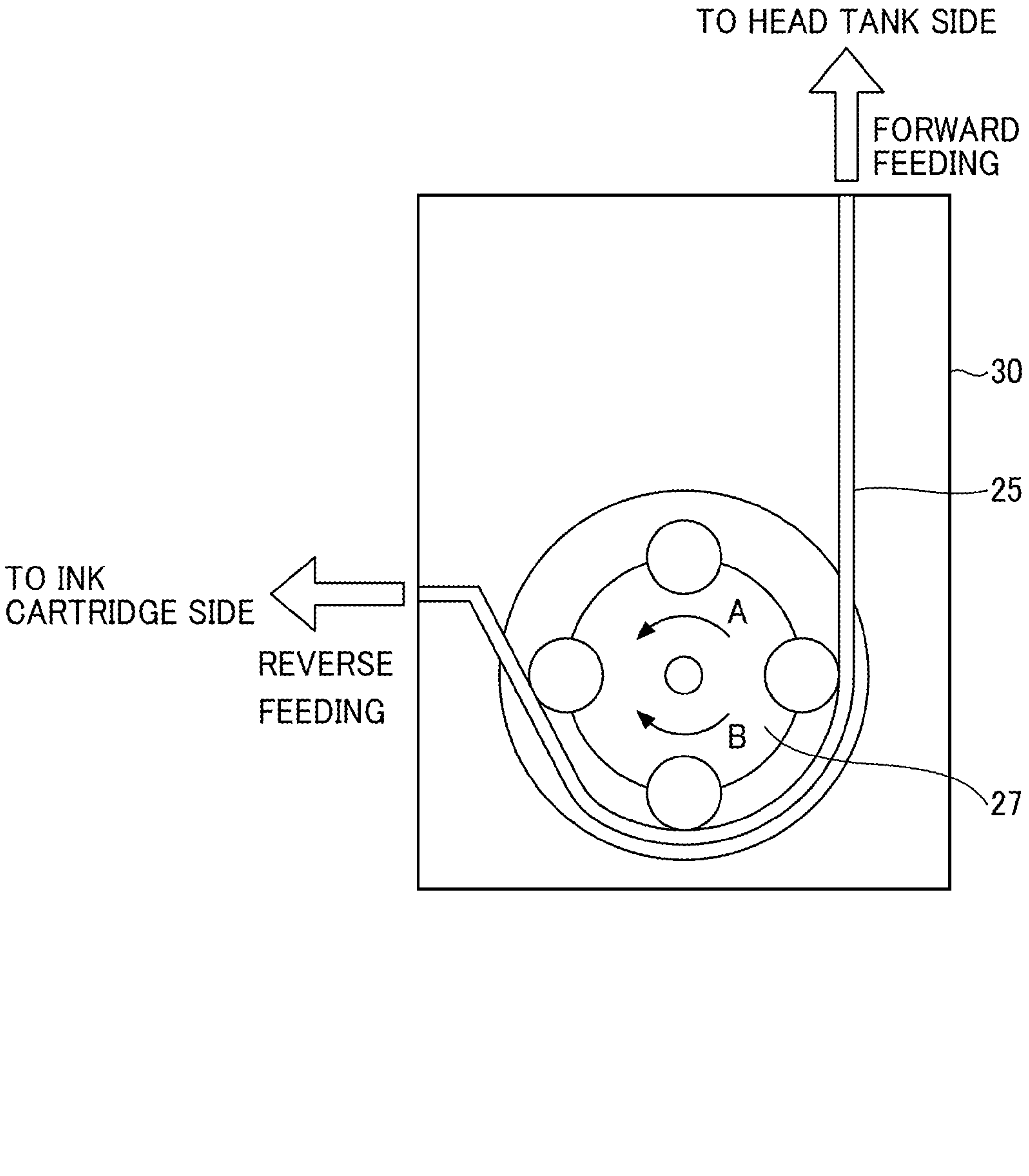
FIG. 8 is a configuration diagram of a liquid feeding pump of the liquid discharge apparatus according to an embodiment.

FIG. 8 is a configuration diagram of a liquid feeding pump of the liquid discharge apparatus according to an embodiment. As the liquid feeding pump 24, a tube pump 30 is adopted in which the pump structure is not complicated and the forward feeding and the reverse feeding of the ink can be changed by changing the rotation direction of the drive motor. A rubber tube 25 for liquid feeding is wound inside the tube pump 30. The rubber tube 25 is locally squeezed by the pump rotor 27 built inside the pump, and the pump rotor 27 is rotated to move a squeezed point in the rotation direction, whereby the ink is fed in the rotation direction of the pump rotor 27.

Specifically, when the ink is fed forward from the ink cartridge 10 to the head tank 35, the pump rotor 27 is rotated in the rotation direction of an arrow A. On the other hand, when the ink is fed reversely from the head tank 35 to the ink cartridge 10, the pump rotor 27 is rotated in the rotation direction of an arrow B. In the rotation of the pump rotor 27, the rotation in the rotation direction of the arrow A is referred to as forward rotation, and the rotation in the rotation direction of the arrow B is referred to as backward rotation. By controlling the forward rotation and the backward rotation of the pump rotor 27, the liquid feeding direction of the ink can be controlled.

By using the tube pump 30 having a simple configuration as the liquid feeding pump 24, a pump configuration having a small space is obtained. Furthermore, since the liquid feeding direction can be controlled by forward/backward rotation control of the pump driving motor, the piping becomes simple. Note that the structure of the tube pump 30 is not limited to the rotary roller type as illustrated in FIG. 8, and may be an eccentric cam type or the like.

Head Tank Operation of Liquid Discharge Apparatus

Figure 9A:
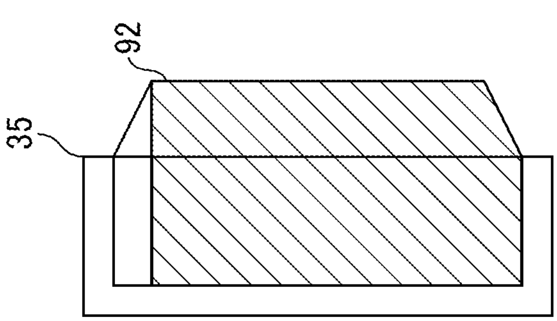
FIGS. 9A to 9C are views illustrating an operation of a head tank of the liquid discharge apparatus according to an embodiment.
Figure 9B:
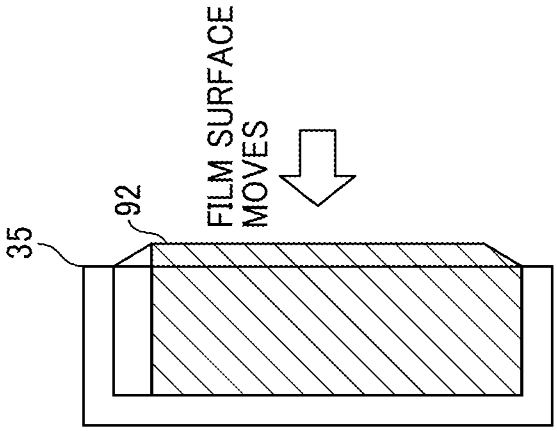
Figure 9C:
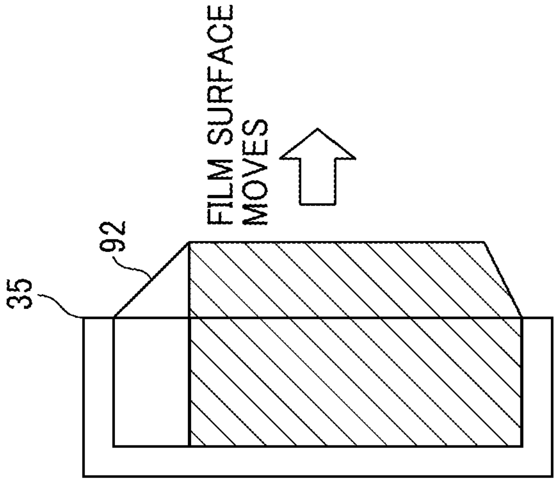

FIGS. 9A to 9C are diagrams illustrating an operation of a head tank of the liquid discharge apparatus according to an embodiment. FIG. 9A is a view illustrating a state in which the head tank 35 is full, FIG. 9B is a view illustrating a state in which a negative pressure is generated in the head tank 35, and FIG. 9C is a view illustrating a state in which the head tank 35 is opened to the atmosphere and the liquid level is lowered.

As illustrated in FIG. 9A, when the head tank 35 is full and the atmosphere release valve 94 (see FIG. 5) is in the closed state, once suction (see FIG. 6) is performed by the suction pump 22, the film 92 is closed, a negative pressure is generated in the head tank, and the state transitions to the state illustrated in FIG. 9B. At this time, the height of the liquid level hardly changes. The same applies to the case of performing reverse feeding by the liquid feeding pump 24 (see FIG. 7) or the case of discharging liquid by the liquid discharge head 34.

In the head tank 35 illustrated in FIG. 9B, once the atmosphere release valve 94 is opened, the film 92 is opened, the liquid level is lowered, and the state transitions to the state illustrated in FIG. 9C. Note that as the negative pressure increases, the degree of lowering of the liquid level and the degree of opening of the film 92 increase.

In the head tank 35 illustrated in FIG. 9C, once the atmosphere release valve 94 is closed and the forward feeding is performed by the liquid feeding pump 24, the liquid level rises, and the state transitions to the state illustrated in FIG. 9A. When the liquid level detection mechanism 95 (see FIG. 5) detects the liquid level, the forward feeding by the liquid feeding pump 24 is stopped.

In the head tank 35 illustrated in FIGS. 9A and 9B, when the forward feeding by the liquid feeding pump 24 is performed with the atmosphere release valve 94 in the closed state, the opening degree of the film 92 increases although the liquid level hardly changes.

The ink end detection of the ink cartridge 10 is performed as follows. When the ink cartridge 10 is in an empty state, once ink is consumed by ink discharge, head suction, or the like, the pressure in the film 92 decreases. Once the pressure in the film 92 decreases, the negative pressure lever 91 serving as a pressure detection unit is displaced. Once the negative pressure lever 91 crosses the negative pressure lever sensor, it is determined that the ink cartridge 10 is in an empty state (ink end detection).

The remaining amount of ink is stored in the non-volatile memory 316 provided in the ink cartridge 10, and the current remaining amount of ink can be obtained by subtracting the consumption amount from the past remaining amount of ink. The cumulative ink consumption amount of the ink cartridge 10 is obtained by adding the consumption amount due to head suction or ink discharge. That is, the current remaining amount of ink can be calculated by subtracting the ink consumption amount from the ink volume.

Maintenance and Recovery Mechanism of Liquid Discharge Apparatus

Figure 10:
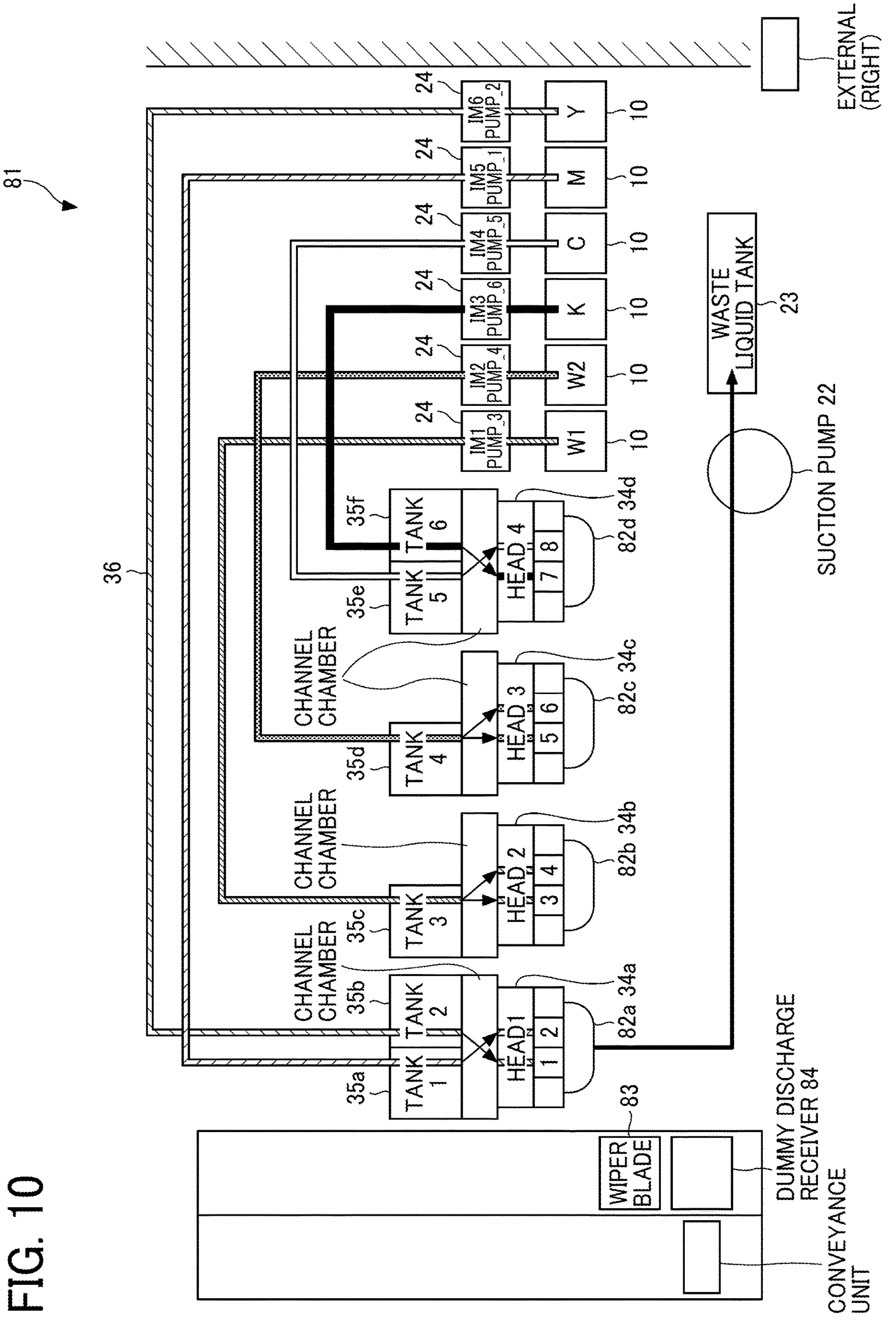
FIG. 10 is a configuration diagram of a maintenance and recovery mechanism of the liquid discharge apparatus according to an embodiment.

FIG. 10 is a configuration diagram of a maintenance and recovery mechanism of the liquid discharge apparatus according to an embodiment. The maintenance and recovery mechanism 81 includes six ink cartridges 10, six liquid feeding pumps 24, six liquid supply tubes 36, and six head tanks 35. The maintenance and recovery mechanism 81 includes four liquid discharge heads 34, four cap members 82, a suction pump 22, a waste liquid tank 23, a wiper blade 83, a first idle discharge receiver 84, and the like.

The ink of W1 is supplied from the ink cartridge 10 of W1 to the third head tank 35*c* (Tank No. 3) through the liquid supply tube 36 of W1, and is discharged from the third nozzle row and the fourth nozzle row of the second liquid discharge head 34*b* (Head No. 2).

The ink of W2 is supplied from the ink cartridge 10 of W2 to the fourth head tank 35*d* (Tank No. 4) through the liquid supply tube 36 of W2, and is discharged from the fifth nozzle row and the sixth nozzle row of the third liquid discharge head 34*c* (Head No. 3).

The ink of K is supplied from the ink cartridge 10 of K to the sixth head tank 35*f* (Tank No. 6) through the liquid supply tube 36 of K, and is discharged from the seventh nozzle row of the fourth liquid discharge head 34*d* (Head No. 4).

The ink of C is supplied from the ink cartridge 10 of C to the fifth head tank 35*e* (Tank No. 5) through the liquid supply tube 36 of C, and is discharged from the eighth nozzle row of the fourth liquid discharge head 34*d* (Head No. 4).

The ink of M is supplied from the ink cartridge 10 of M to the first head tank 35*a* (Tank No. 1) via the liquid supply tube 36 of M, and is discharged from the second nozzle row of the first liquid discharge head 34*a* (Head No. 1).

The ink of Y is supplied from the ink cartridge 10 of Y to the second head tank 35*b* (Tank No. 2) via the liquid supply tube 36 of Y, and is discharged from the first nozzle row of the first liquid discharge head 34*a* (Head No. 1).

The nozzle surface of the first liquid discharge head 34*a* (Head No. 1) is capped by the first cap member 82*a*. Then, any one of the ink of Y contained in the first head tank 35*a* (Tank No. 2) and the ink of M contained in the second head tank 35*b* (Tank No. 2) is sucked by the suction pump 22 and discharged to the waste liquid tank 23.

The nozzle surface of the second liquid discharge head 34*b* (Head No. 2) is capped by the second cap member 82*b*. Then, the ink of W1 contained in the third head tank 35*c* (Tank No. 3) is sucked by the suction pump 22 and discharged to the waste liquid tank 23.

The nozzle surface of the third liquid discharge head 34*c* (Head No. 3) is capped by the third cap member 82*c*. Then, the ink of W2 contained in the fourth head tank 35*d* (Tank No. 4) is sucked by the suction pump 22 and discharged to the waste liquid tank 23.

The nozzle surface of the fourth liquid discharge head 34*d* (Head No. 4) is capped by the fourth cap member 82*d*. Then, any one of the ink of C contained in the fifth head tank 35*e* (Tank No. 5) and the ink of K contained in the sixth head tank 35*f* (Tank No. 6) is sucked by the suction pump 22 and discharged to the waste liquid tank 23.

Liquid Exchange Method of Liquid Discharge Apparatus

The manufacturer of the inkjet printer 100 configured as described above may update the version of the ink by depletion of the material of the ink, improvement of color developability, or the like. However, depending on the type of the material of the ink, in a case where inks of different versions produced using different materials are mixed with each other, an undesirable chemical reaction or a change in the dispersion state of the dispersion in the ink may occur, causing aggregation of the ink. The aggregation of the ink may cause a failure of the apparatus or an image defect.

For example, for the white ink using titanium oxide as a material, the ink may be adhered to the liquid supply mechanism although the viscosity or surface tension is hardly different from other inks such as K, C, M, and Y. Even if the cleaning operation equivalent to other inks such as K, C, M, and Y is executed on such white ink, the adhered ink remains in the ink path such as the liquid supply mechanism or the liquid discharge head, and the adhered ink cannot be completely substituted with a cleaning agent. Therefore, in particular, in a case of an ink that tends to be adhered, such as a white ink, when white inks of different versions are mixed with each other, there is a high possibility of causing a failure of the apparatus or an image defect.

The inkjet printer 100 according to the present embodiment includes two cartridge insertion ports 4 into which two ink cartridges 10 containing inks having an identical color of W1 and W2 are inserted, respectively. Therefore, in a case where two ink cartridges 10 containing white inks of different versions are used in a mixed manner, an image defect may be caused by an undesirable chemical reaction between the white inks.

Furthermore, in the inkjet printer 100 according to the present embodiment, the ink of W1 and the ink of W2 are discharged from different liquid discharge heads 34 (Head No. 2 and Head No. 3). Therefore, the white inks of different versions supplied from the two ink cartridges 10 inserted into the two cartridge insertion ports 4 do not aggregate in the ink path.

However, in a case of adopting a configuration in which the ink of W1 and the ink of W2 are both discharged from the liquid discharge head 34, white inks of different versions may aggregate in the ink path. In such a case, there is a possibility of causing a failure of the apparatus or an image defect.

Therefore, in a case where two ink cartridges 10 containing white inks of different versions are used in a mixed manner, the inkjet printer 100 outputs information prompting exchange of the ink cartridge 10 to the operation panel 5. Note that the output unit is not limited to the operation panel 5, and may be the liquid discharge head 34 that performs printing on the recording medium 42.

Figure 11:
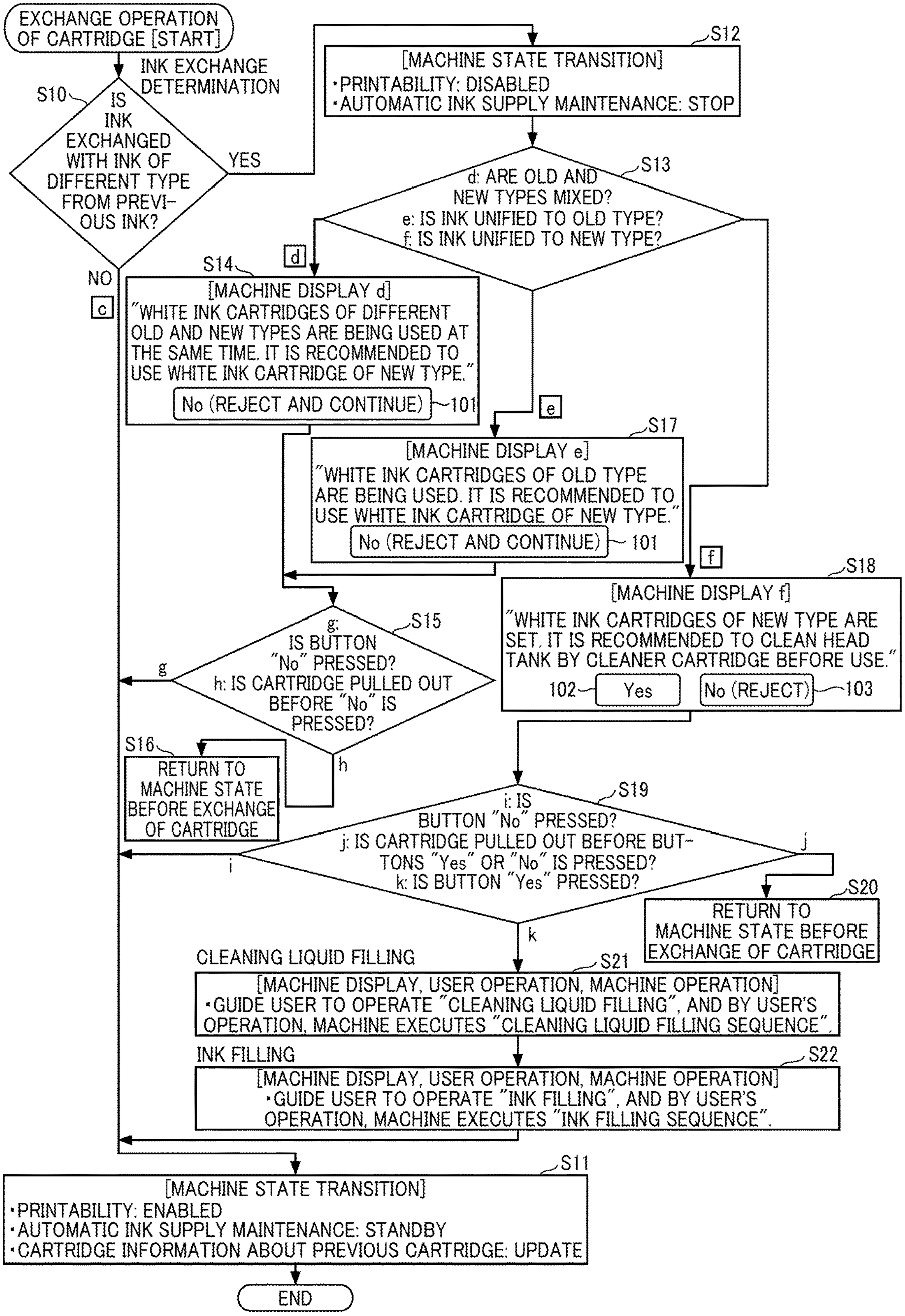
FIG. 11 is a flowchart illustrating a liquid exchange procedure of the liquid discharge apparatus according to an embodiment.

FIG. 11 is a flowchart illustrating a liquid exchange procedure of the liquid discharge apparatus according to an embodiment.

The flowchart illustrated in FIG. 11 is implemented by a program executed by the CPU constituting the main controller 301 of the inkjet printer 100.

First, as an exchange operation (start) of the ink cartridge 10, the main controller 301 acquires information on the two ink cartridges 10 from the two non-volatile memories 316 provided in the ink cartridges 10 of W1 and W2 via the cartridge communication circuit 314.

Step S10

The main controller 301 determines whether or not at least one of the ink cartridges 10 of W1 and W2 is exchanged with an ink cartridge 10 containing an ink of a different type from the previous ink based on the information (type code of ink) on the ink cartridge 10. The ink of the type different from the previous ink includes an ink of a different version from the previous ink.

Step S11

In a case where the main controller 301 detects that the ink cartridges 10 of W1 and W2 are exchanged with the ink cartridges 10 containing an ink of the same type as the previous ink (NO in step S10), the main controller 301 controls to transition the state of the apparatus as follows and end the process (operation c).

Printing possibility: Possible

Automatic ink supply maintenance: Standby

Information on the previous ink cartridge 10: Update

Step S12

In a case where the main controller 301 detects that at least one of the ink cartridges 10 of W1 and W2 is exchanged with the ink cartridge 10 containing an ink of a different type from the previous ink (YES in step S10), the main controller 301 controls to transition the state of the apparatus as follows.

Printability: Disabled

Automatic ink supply maintenance: Stop

Step S13

Next, the main controller 301 checks the state change of the version of the white ink contained in the ink cartridges 10 of W1 and W2 before and after exchange. In a case where the main controller 301 detects that ink cartridges 10 of different old and new types are mixed (operation d), the process proceeds to step S14. Note that the ink cartridges 10 of different old and new types are the ink cartridges 10 containing white inks of different old and new versions.

In a case where the main controller 301 detects that the ink cartridges 10 of W1 and W2 are unified to the ink cartridges 10 of the old type (operation e), the process proceeds to step S17. Note that the ink cartridges 10 of the old type are the ink cartridges 10 containing the white ink of the old version.

In a case where the main controller 301 detects that the ink cartridges 10 of W1 and W2 are unified to the ink cartridges 10 of the new type (operation f), the process proceeds to step S18. Note that the ink cartridges 10 of the new type are the ink cartridges 10 containing the white ink of the new version.

Step S14

In a case where the main controller 301 detects that ink cartridges 10 of different old and new types are mixed (operation d in step S13), controls the operation panel 5 to output information prompting exchange of the ink cartridge 10.

The main controller 301 preferably controls the operation panel 5 to output information prompting exchange of the ink cartridge 10 so that the ink cartridges 10 of W1 and W2 are unified to the ink cartridges 10 of the new type.

For example, the operation panel 5 outputs a guidance prompting exchange of the ink cartridge 10 such as "White ink cartridges of different old and new types are being used at the same time. It is recommended to use white ink cartridges of the new type.". Such guidance may be displayed on the touch panel display of the operation panel 5 or may be output as sound from the speaker of the operation panel 5. Alternatively, the main controller 301 may control such guidance to be printed on the recording medium 42.

The operation panel 5 is preferably provided with a first rejection unit 101 such as a rejection button for the user to reject exchange of the ink cartridge 10.

Step S15

Subsequently, the main controller 301 detects that the rejection button "No" is pressed on the operation panel 5 (operation g). Furthermore, the main controller 301 detects that at least one of the ink cartridges 10 of W1 and W2 is pulled out from the cartridge insertion port 4 before the rejection button "No" is pressed (operation h). In a case where the main controller 301 detects that the rejection button "No" is pressed (operation g), the process proceeds to step S11. In a case where the main controller 301 detects that the ink cartridge 10 is pulled out before the rejection button "No" is pressed (operation h), the process proceeds to step S16.

Step S16

In a case where the main controller 301 detects that at least one of the ink cartridges 10 of W1 and W2 is pulled out from the cartridge insertion port 4 within a predetermined time, the main controller 301 turns off the guidance of the operation panel 5 and returns to the state (start) before the exchange of the ink cartridge 10.

Step S17

In a case where the main controller 301 detects that the ink cartridges 10 of W1 and W2 are unified to the ink cartridges 10 of the old type (operation e of step S13), the main controller 301 controls the operation panel 5 to output information prompting exchange of the ink cartridge 10.

The main controller 301 preferably controls the operation panel 5 to output information prompting exchange of the ink cartridge 10 so that the ink cartridges 10 of W1 and W2 are unified to the ink cartridges 10 of the new type.

For example, the operation panel 5 outputs a guidance prompting exchange of the ink cartridge 10 such as "A white ink cartridge of the old type is being used. It is recommended to use a white ink cartridge of the new type.". Such guidance may be displayed on the touch panel display of the operation panel 5 or may be output as sound from the speaker of the operation panel 5. Alternatively, the main controller 301 may control such guidance to be printed on the recording medium 42.

The operation panel 5 is preferably provided with a first rejection unit 101 such as a rejection button for the user to reject exchange of the ink cartridge 10.

Step S18

In a case where the main controller 301 detects that the ink cartridges 10 of W1 and W2 are unified to the ink cartridges 10 of the new type (operation f of step S13), the main controller 301 controls the operation panel 5 to output information prompting liquid substitution operation in the ink path.

Thus, the main controller 301 (circuitry) is configured to: in response to acquisition of the information of the multiple liquid containers (ink cartridges 10) each containing the liquid having the identical color of an identical new version, cause the display (operation panel 5) to display information prompting a liquid substitution operation to substitute the liquid in a liquid channel.

The main controller 301 preferably controls the operation panel 5 to output information prompting a cleaning operation using a cleaner cartridge before using the ink cartridges 10 of W1 and W2.

For example, the operation panel 5 outputs a guidance prompting a cleaning operation using a cleaner cartridge such as "A white ink cartridge of the new type is set. It is recommended to clean using the cleaner cartridge before use.". Such guidance may be displayed on the touch panel display of the operation panel 5 or may be output as sound from the speaker of the operation panel 5. Alternatively, the main controller 301 may control such guidance to be printed on the recording medium 42.

The operation panel 5 is preferably provided with an acceptance unit 102 such as an acceptance button for the user to accept the liquid substitution operation, and a second rejection unit 103 such as a rejection button for the user to reject the liquid substitution operation.

Step S19

Subsequently, the main controller 301 confirms the desire of the liquid substitution operation of the user. In a case where the main controller 301 detects that the rejection button "No" is pressed on the operation panel 5 (operation i), the process proceeds to step S11.

In a case where the main controller 301 detects that at least one of the ink cartridges 10 of W1 and W2 is pulled out from the cartridge insertion port 4 before the acceptance button "Yes" or the rejection button "No" is pressed (operation j), the process proceeds to step S20. In a case where the main controller 301 detects that the acceptance button "Yes" is pressed on the operation panel 5 (operation k), the process proceeds to step S21.

Step S20

In a case where the main controller 301 detects that the ink cartridge 10 is pulled out before the acceptance button "Yes" or the rejection button "No" is pressed, the main controller 301 turns off the guidance of the operation panel 5 and returns to the state (start) before the exchange of the ink cartridge 10.

Step S21

The main controller 301 controls the operation panel 5 to output information prompting an operation of filling the head tank 35 with the cleaning liquid from the cleaner cartridge. Then, the main controller 301 executes a process of filling the cleaning liquid according to the operation of the user.

Step S22

The main controller 301 controls the operation panel 5 to output information prompting an operation of filling the head tank 35 with ink from the ink cartridge 10 of the new type. Then, the main controller 301 executes a process of filling the ink according to the operation of the user.

Step S11

Then, in a case where the liquid substitution operation is completed, the main controller 301 controls to transition the state of the apparatus as follows and end the process.

Printability: Enabled

Automatic ink supply maintenance: Standby

Information on the previous ink cartridge 10: Update

Table 1 below illustrates the versions of the inks (Ver1 (old) and Ver2 (new)) contained in the ink cartridges 10 of W1 and W2 before and after exchange, the state change of the version of the white ink, and the flow of the operations c to f of the inkjet printer 100. Such operations c to f correspond to the operations c to f in the flowchart illustrated in FIG. 11.

TABLE 1

| | Cartridge before exchange | | Cartridge after exchange | | | | |
|---|---|---|---|---|---|---|---|
| Outline | Insertion port W1 | Insertion port W2 | Insertion port W1 | Insertion port W2 | State change | Operation | Example of operation flow |
| Old only | W-Ver1 (old) | W-Ver1 (old) | W-Ver1 (old) | W-Ver1 (old) | Ver1 (old) as it is | c: normal operation after ink exchange | Operation c |
| | W-Ver1 (old) | W-Ver1 (old) | W-Ver1 (old) | W-Ver2 (new) | Same version → versions mixed | d: Guidance on recommending unification of types to new ink.<br>Normal operation after ink exchange when "Rejection button" is pressed.<br>After cartridge is pulled out, screen guidance disappears and returns to state before exchange. | Operation d → user exchanges cartridge of same new version → Operation f |
| | W-Ver1 (old) | W-Ver1 (old) | W-Ver2 (new) | W-Ver1 (old) | Same version → versions mixed | d: Guidance on recommending unification of types to new ink.<br>Normal operation after ink exchange when "Rejection button" is pressed.<br>After cartridge is pulled out, screen guidance disappears and returns to state before exchange. | |
| | W-Ver1 (old) | W-Ver1 (old) | W-Ver2 (new) | W-Ver2 (new) | Same version → Ver2 (new) | f: Guidance on liquid substitution operation.<br>Guidance from cleaning to ink filling when "Acceptance button" is pressed.<br>Normal operation after ink exchange when "Rejection button" is pressed. | Operation f |
| Old and new mixed | W-Ver1 (old) | W-Ver2 (new) | W-Ver1 (old) | W-Ver1 (old) | Versions mixed → Ver1 (old) | e: Guidance on recommending use of new ink.<br>Normal operation after ink exchange when "Rejection button" is pressed.<br>After cartridge is pulled out, screen guidance disappears and returns to state before exchange. | Operation e → user exchanges cartridge of same new version → Operation f |
| | W-Ver1 (old) | W-Ver2 (new) | W-Ver1 (old) | W-Ver2 (new) | Versions mixed → versions mixed | d: Guidance on recommending unification of types to new ink.<br>Normal operation after ink exchange when "Rejection button" is pressed.<br>After cartridge is pulled out, screen guidance disappears and returns to state before exchange. | Operation d → user exchanges cartridge of same new version → Operation f |
| | W-Ver1 (old) | W-Ver2 (new) | W-Ver2 (new) | W-Ver1 (old) | Versions mixed → versions mixed | d: Guidance on recommending unification of types to new ink.<br>Normal operation after ink exchange when "Rejection button" is pressed.<br>After cartridge is pulled out, screen guidance disappears and returns to state before exchange. | |
| | W-Ver1 (old) | W-Ver2 (new) | W-Ver2 (new) | W-Ver2 (new) | Versions mixed → Ver2 (new) | f: Guidance on liquid substitution operation.<br>Guidance from cleaning to ink filling when "Acceptance button" is pressed.<br>Normal operation after ink exchange when "Rejection button" is pressed. | Operation f |

TABLE 1-continued

| | Cartridge before exchange | | Cartridge after exchange | | | | |
|---|---|---|---|---|---|---|---|
| Outline | Insertion port W1 | Insertion port W2 | Insertion port W1 | Insertion port W2 | State change | Operation | Example of operation flow |
| Old and new mixed | W-Ver2 (new) | W-Ver1 (old) | W-Ver1 (old) | W-Ver1 (old) | Versions mixed → Ver1 (old) | e: Guidance on recommending use of new ink. Normal operation after ink exchange when "Rejection button" is pressed. After cartridge is pulled out, screen guidance disappears and returns to state before exchange. | Operation e → user exchanges cartridge of same new version → Operation f |
| | W-Ver2 (new) | W-Ver1 (old) | W-Ver1 (old) | W-Ver2 (new) | Versions mixed → versions mixed | d: Guidance on recommending unification of types to new ink. Normal operation after ink exchange when "Rejection button" is pressed. After cartridge is pulled out, screen guidance disappears and returns to state before exchange. | Operation d → user exchanges cartridge of same new version → Operation f |
| | W-Ver2 (new) | W-Ver1 (old) | W-Ver2 (new) | W-Ver1 (old) | Versions mixed → versions mixed | d: Guidance on recommending unification of types to new ink. Normal operation after ink exchange when "Rejection button" is pressed. After cartridge is pulled out, screen guidance disappears and returns to state before exchange. | |
| | W-Ver2 (new) | W-Ver1 (old) | W-Ver2 (new) | W-Ver2 (new) | Versions mixed → Ver2 (new) | f: Guidance on liquid substitution operation. Guidance from cleaning to ink filling when "Acceptance button" is pressed. Normal operation after ink exchange when "Rejection button" is pressed. | Operation f |
| New only | W-Ver2 (new) | W-Ver2 (new) | W-Ver1 (old) | W-Ver1 (old) | Same version → Ver1 (old) | e: Guidance on recommending use of new ink. Normal operation after ink exchange when "Rejection button" is pressed. After cartridge is pulled out, screen guidance disappears and returns to state before exchange. | Operation e → user exchanges cartridge of same new version → Operation f |
| | W-Ver2 (new) | W-Ver2 (new) | W-Ver1 (old) | W-Ver2 (new) | Same version → versions mixed | d: Guidance on recommending unification of types to new ink. Normal operation after ink exchange when "Rejection button" is pressed. After cartridge is pulled out, screen guidance disappears and returns to state before exchange. | Operation d → user exchanges cartridge of same new version → Operation f |
| | W-Ver2 (new) | W-Ver2 (new) | W-Ver2 (new) | W-Ver1 (old) | Same version → versions mixed | d: Guidance on recommending unification of types to new ink. Normal operation after ink exchange when "Rejection button" is pressed. After cartridge is pulled out, screen guidance disappears and returns to state before exchange. | |
| | W-Ver2 (new) | W-Ver2 (new) | W-Ver2 (new) | W-Ver2 (new) | Ver2 (new) as it is | c: Normal operation after ink exchange | Operation c |

Liquid Substitution Method of Liquid Discharge Apparatus

Figure 12:
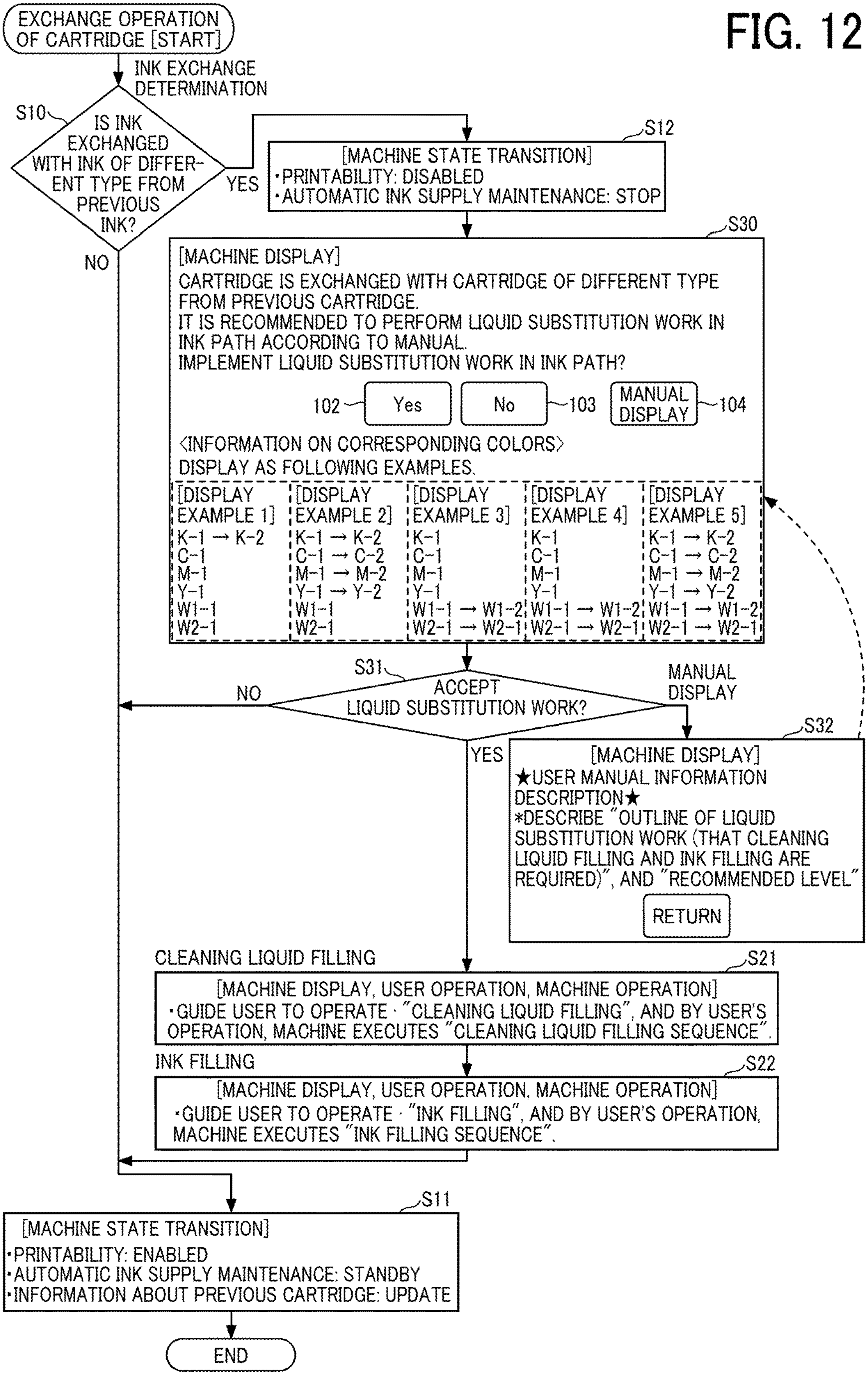
FIG. 12 is a flowchart illustrating a liquid substitution procedure of the liquid discharge apparatus according to an embodiment.

Next, details of the liquid substitution operation will be described. FIG. 12 is a flowchart illustrating a liquid substitution procedure of the liquid discharge apparatus according to an embodiment. The flowchart illustrated in FIG. 12 is implemented by a program executed by the CPU constituting the main controller 301 of the inkjet printer 100.

First, as an exchange operation (start) of the ink cartridge 10, the main controller 301 acquires information on the six ink cartridges 10 from the six non-volatile memories 316 provided in the six ink cartridges 10 via the cartridge communication circuit 314.

Step S10

Next, the main controller 301 determines whether or not at least one of the six ink cartridges 10 is exchanged with an ink cartridge 10 containing an ink of a different type from the previous ink based on the information (for example, the type code of the ink) on the ink cartridge 10.

Step S11

Then, in a case where the main controller 301 detects that at least one of the six ink cartridges 10 is exchanged with the ink cartridge 10 containing an ink of the same type as the previous ink (NO in step S10), the main controller 301 controls to transition the state of the apparatus as follows and end the process.

Printability: Enabled

Automatic ink supply maintenance: Standby

Information on the previous ink cartridge 10: Update

Step S12

In a case where the main controller 301 detects that at least one of the six ink cartridges 10 is exchanged with the ink cartridge 10 containing an ink of a different type from the previous ink (YES in step S10), the main controller 301 controls to transition the state of the apparatus as follows.

Printability: Disabled

Automatic ink supply maintenance: Stop

Step S30

In a case where the main controller 301 detects that at least one of the six ink cartridges 10 is exchanged with the ink cartridge 10 containing an ink of a different type from the previous ink, the main controller 301 controls the operation panel 5 to output information prompting the liquid substitution operation in the ink path.

For example, the operation panel 5 outputs a guidance of the liquid substitution operation such as "The ink cartridge is exchanged with an ink cartridge of a different type from the previous ink. It is recommended to perform the liquid substitution operation in the ink path according to the manual.". Such guidance may be displayed on the touch panel display of the operation panel 5 or may be output as sound from the speaker of the operation panel 5. Alternatively, the main controller 301 may control such guidance to be printed on the recording medium 42.

The operation panel 5 preferably outputs information indicating a state change of the version of the ink contained in the six ink cartridges 10 before and after exchange. As Display Example 3 and Display Example 4, the state change (W1-1→W1-2) of the version of the ink of W1 before and after exchange is displayed on the operation panel 5. As Display Example 5, the state changes (K-1→K-2, C-1→C-2, M-1→M-2, Y-1→Y-2, W1-1→W1-2, and W2-1→W2-2) of the versions of the inks of K, C, M, Y, W1, and W2 before and after exchange are displayed on the operation panel 5.

Further, the operation panel 5 is provided with an acceptance unit 102 such as an acceptance button for the user to accept the liquid substitution operation, and a second rejection unit 103 such as a rejection button for the user to reject the liquid substitution operation. The operation panel 5 is preferably provided with a manual output unit 104 such as an output button for outputting a manual of the liquid substitution operation.

Step S31

The main controller 301 detects whether or not the user has accepted the liquid substitution operation and whether or not the user has instructed output of the manual.

Step S11

In a case where the main controller 301 detects that the user refuses the liquid substitution operation (NO in step S31), the main controller 301 controls to transition the state of the apparatus as follows and end the process.

Printability: Enabled

Automatic ink supply maintenance: Standby

Information on the previous ink cartridge 10: Update

Step S21

In a case where the main controller 301 detects that the user has accepted the liquid substitution operation (YES in step S31), the main controller 301 controls the operation panel 5 to output information prompting an operation of filling the head tank 35 with the cleaning liquid from the cleaner cartridge. Then, the main controller 301 executes a cleaning liquid filling operation according to the operation of the user.

Step S22

The main controller 301 controls the operation panel 5 to output information prompting an operation of filling the head tank 35 with ink from the ink cartridge 10 of the new type. Then, the main controller 301 executes an ink filling operation according to the operation of the user.

Step S11

Then, in a case where the liquid substitution operation is completed, the main controller 301 controls to transition the state of the apparatus as follows and end the process.

Printability: Enabled

Automatic ink supply maintenance: Standby

Information on the previous ink cartridge 10: Update

Step S32

Note that a case where the main controller 301 detects that an instruction to output the manual of the liquid substitution operation is given (manual display in step S31), the main controller 301 controls the operation panel 5 to display the manual of the liquid substitution operation. Alternatively, the main controller 301 may control a manual of the liquid substitution operation to be printed on the recording medium 42.

The manual of the liquid substitution operation includes an outline of the liquid substitution operation (that cleaning liquid filling and ink filling are required). The manual of the liquid substitution operation preferably includes a recommended level of filling of the cleaning liquid (ink substitution amount by cleaning liquid or filling amount of cleaning liquid).

Table 2 below illustrates the recommended level of filling of the cleaning liquid (filling amount of cleaning liquid) according to the color and version of the ink before exchange, and the recommended level of ink filling (filling amount of ink) according to the color and version of the ink after exchange.

TABLE 2

| Cartridge insertion port | Ink type | Target head | Recommended level of "cleaning liquid filling" in case of ink described on left before liquid substitution | Recommended level of "ink filling" in case of ink described on left planned for liquid substitution | Basis |
|---|---|---|---|---|---|
| K | K-1 | 4 | Level 1 | Level 1 | Normal cleaning level is sufficient. |
| | K-2 | | Level 1 | Level 1 | |
| C | C-1 | | Level 1 | Level 1 | |
| | C-2 | | Level 1 | Level 1 | |
| M | M-1 | 1 | Level 1 | Level 1 | |
| | M-2 | | Level 1 | Level 1 | |
| Y | Y-1 | | Level 0 (substitution amount 0) | Level 0 (substitution amount 0) | Currently, only inks that have no disadvantages in mixing exist, so no substitution operation is required. |
| | Y-2 | | Level 0 (substitution amount 0) | Level 0 (substitution amount 0) | |
| W1 | W1-1 | 2 | Level 3 (three times substitution amount of Level 1) | Level 1 | Due to tendency of precipitates to adhere to filter, and like, stronger cleaning than level 1 is required. |
| | W1-2 | | Level 2 (twice substitution amount of Level 1) | Level 1 | W•-2 is less likely to adhere |

TABLE 2-continued

| Cartridge insertion port | Ink type | Target head | Recommended level of "cleaning liquid filling" in case of ink described on left before liquid substitution | Recommended level of "ink filling" in case of ink described on left planned for liquid substitution | Basis |
|---|---|---|---|---|---|
| W2 | W2-1 | 3 | Level 3 (three times substitution amount of Level 1) | Level 1 | than W•-1, so amount of cleaning can be as low as level 2. |
| | W2-2 | | Level 2 (twice substitution amount of Level 1) | Level 1 | |

For inks of K, C, and M, for example, a normal cleaning level is sufficient regardless of the version of ink before exchange, and therefore a recommended level of filling of the cleaning liquid is Lev. 1. The recommended level Lev. 1 is a normal filling amount of the cleaning liquid.

For the ink of Y, still no disadvantage occurs when the inks before and after exchange are mixed with each other regardless of the version of the ink before exchange, and therefore a recommended level of filling of the cleaning liquid is Lev. 0. The recommended level Lev. 0 means that no liquid substitution operation is required.

For the inks of W1 and W2, when the version of the ink before exchange is the new type (W1-2, W2-2), the precipitate still tends to adhere to the filter and the like, and therefore a recommended level of filling of the cleaning liquid is Lev. 2. The recommended level Lev. 2 is twice the filling amount of the cleaning liquid of the recommended level Lev. 1.

Furthermore, for the inks of W1 and W2, in a case where the version of the ink before exchange is the old type (W1-1, W2-1), the precipitate greatly tends to adhere to the filter and the like, and therefore a recommended level of filling of the cleaning liquid is Lev. 3. The recommended level Lev. 3 is three times the filling amount of the cleaning liquid of the recommended level Lev. 1.

Operation and Effect

According to the above embodiment, in a case where it is detected that the ink cartridges 10 of W1 and W2 contain white inks of different versions, the inkjet printer 100 outputs information prompting exchange of the ink cartridge 10. The inkjet printer 100 prompts exchange of the ink cartridges 10 so as to unify the ink cartridges 10 of W1 and W2 into ink cartridges containing the white ink of the same version. Therefore, it is possible to prevent the ink cartridges 10 of W1 and W2 containing white inks of different versions from being used in a mixed manner. In turn, the possibility of causing a failure of the apparatus or an image defect can be reduced.

In particular, in a case where it is detected that the ink cartridges 10 of W1 and W2 contain white inks of different old and new versions, the inkjet printer 100 prompts the exchange so as to unify the ink cartridges to the ink cartridges containing the white ink of the new version. Therefore, the use of the ink cartridges 10 of W1 and W2 containing the white ink of the new version is promoted, and the possibility of causing a failure of the apparatus or an image defect can be further reduced.

Further, in a case where it is detected that both of the ink cartridges 10 of W1 and W2 contain the white ink of the old version, the inkjet printer 100 prompts the exchange so as to unify the ink cartridges to the ink cartridges containing the white ink of the new version. Therefore, the use of the ink cartridges 10 of W1 and W2 containing the white ink of the new version is further promoted.

Further, in a case where at least one of the ink cartridges 10 of W1 and W2 is pulled out from the cartridge insertion port 4 after outputting the information prompting exchange of the ink cartridge 10, the inkjet printer 100 returns to the state before the exchange of the ink cartridge 10. Therefore, it is possible to check again whether or not the ink cartridges 10 of W1 and W2 after exchange contain white inks of different versions.

Further, in a case where it is detected that both of the ink cartridges 10 of W1 and W2 contain the white ink of new version, the inkjet printer 100 outputs information prompting the liquid substitution operation in the ink path. Therefore, by executing the liquid substitution operation in a case where the ink cartridges 10 of W1 and W2 both contain the white ink of the new version, the image quality when using the white ink of the new version can be improved. Further, by performing the liquid substitution operation only in a case where the ink cartridges 10 of W1 and W2 contain the white ink of the new version, the consumption amount of the cleaner cartridge can be reduced.

Furthermore, the inkjet printer 100 outputs information indicating a state change of the version of the white ink contained in the ink cartridges 10 of W1 and W2 before and after exchange. Therefore, the user can easily recognize the versions of the white ink contained in the ink cartridges 10 of W1 and W2 before and after exchange.

The inkjet printer 100 outputs the manual of the liquid substitution operation. The output manual of the liquid substitution operation includes the recommended level of the filling of the cleaning liquid (filling amount) corresponding to the version of the white ink contained in the ink cartridges 10 of W1 and W2 before exchange. Therefore, the user can easily recognize the recommended level of filling of the cleaning liquid corresponding to the version of the white ink contained in the ink cartridges 10 of W1 and W2 before exchange.

Note that the inkjet printer 100 may be a garment printer which is a clothing printing machine. In a case where the inkjet printer 100 is the garment printer, the inkjet printer 100 may include a platen on which a recording medium such as clothes is loaded instead of the discharge tray 3.

Furthermore, the ink cartridge 10 that contains the ink having an identical color is not limited to the ink cartridges 10 of W1 and W2, and may be multiple ink cartridges 10 that contains the ink having an identical color of any one of K, C, M, and Y. Furthermore, the number of the multiple ink cartridges 10 containing the ink having an identical color is not limited to two, and may be three or more. Furthermore, it should be noted that even among the ink cartridges 10 of the new type or among the ink cartridges 10 of the old type, inks of different versions of may be contained.

Each function of the embodiments described above can be implemented by one processing circuit or multiple processing circuits. Here, the "processing circuit" or "circuitry" in the present description includes a processor programmed to execute each function by software like a processor implemented by an electronic circuit. The "processing circuit" includes any device such as an ASIC and a digital signal processor (DSP) designed to execute each function. The "processing circuit" includes devices such as a field programmable gate array (FPGA) and a conventional circuit module.

Although the preferred embodiments are described in detail above, the present invention is not limited to the above-described embodiments, and various modifications and substitutions can be made to the above-described embodiments without departing from the scope described in the claims.

For example, as an embodiment of the present disclosure, in a case where it is detected that all of the multiple ink cartridges 10 (liquid containers) illustrated in FIG. 1 contains the ink (liquid) having an identical color of the new version, when the initial filling flag is False, information prompting the ink substitution operation in the ink path may be output by the operation panel 5 (output unit), and when the initial filling flag is True, the ink filling operation may be executed or information prompting the ink filling operation may be output by the operation panel 5. According to this aspect, in a case where it is detected that all of the multiple ink cartridges 10 contains the ink having an identical color of the new version, the inkjet printer 100 (liquid discharge apparatus) can prompt the user to perform the operation according to the ink filling situation in the inkjet printer 100, or can execute the operation according to the ink filling situation.

For example, when the inkjet printer 100 is shipped as a new one from the factory, the initial filling flag is True in a state where the inkjet printer 100 is not filled with ink. Thereafter, once the inkjet printer 100 is filled with ink, the initial filling flag is switched to False. Further details of the initial filling flag can be referred to Japanese Unexamined Patent Application Publication No. 2000-289215, Japanese Unexamined Patent Application Publication No. 11-138858, Japanese Unexamined Patent Application Publication No. 2016-97649, and the like.

The state in which the inkjet printer 100 is not a new one and the ink is unfilled by, for example, the user cleaning the liquid channel or the inkjet printer 100 (that is, from the viewpoint of filling, the inkjet printer 100 can be regarded as a new one) may also be included in the state in which the "initial filling flag is True".

In addition, all numbers such as ordinal numbers and numbers used in the description of the above-described embodiments are exemplified to specifically describe the technology of the present disclosure, and the present disclosure is not limited to the exemplified numbers. Further, a connection relation between the components is exemplified for the purpose of describing the technology of the embodiments of the present disclosure, and the connection relation to enable the functions of the present disclosure is not limited to the connection relation as described above.

Aspects of the present disclosure are, for example, as follows.

According to a first aspect (Aspect 1), a liquid discharge apparatus including:

- a discharge unit that discharges a liquid;
- multiple liquid containers that contains the liquid having an identical color to each other;
- multiple insertion ports (4) that allows an insertion of each of the multiple liquid containers (10);
- an acquisition unit (314, 300) that acquires information on the multiple liquid containers (10) inserted into the multiple insertion ports (4); and
- an output unit (5) configured to, in a case where it is detected based on the information on the multiple liquid containers (10) that the multiple liquid containers (10) contains the liquid having the identical color of different versions from each other, output information prompting exchange of the liquid containers (10) so as to unify the multiple liquid containers (10) into the multiple liquid containers (10) containing the liquid having the identical color of an identical version to each other.

According to a second aspect (Aspect 2), in the liquid discharge apparatus of the first aspect (Aspect 1), the output unit, in a case where it is detected that the multiple liquid containers contains the liquid having the identical color of different old and new versions, outputs information prompting exchange of the liquid containers so as to unify the multiple liquid containers into the multiple liquid containers containing the liquid having the identical color of a new version.

According to a third aspect (Aspect 3), in the liquid discharge apparatus of the first aspect (Aspect 1) or the second aspect (Aspect 2), the output unit, in a case where it is detected that all of the multiple liquid containers contains the liquid having the identical color of an old version, outputs information prompting exchange of the liquid containers so as to unify the multiple liquid containers into the multiple liquid containers containing the liquid having the identical color of a new version.

According to a fourth aspect (Aspect 4), the liquid discharge apparatus of the first aspect (Aspect 1) or the second aspect (Aspect 2) further including a main controller that returns an exchange operation of the liquid containers to a state before an exchange of the liquid containers in a case where at least one of the multiple liquid containers is pulled out from the insertion port.

According to a fifth aspect (Aspect 5), in the liquid discharge apparatus according to any one of the first aspect (Aspect 1) to the fourth aspect (Aspect 4), the output unit, in a case where it is detected that all of the multiple liquid containers contains the liquid having the identical color of a new version, outputs information prompting a liquid substitution operation in a liquid channel.

According to a sixth aspect (Aspect 6), in the liquid discharge apparatus according to any one of the first aspect (Aspect 1) to the fifth aspect (Aspect 5), in a case where it is detected that all of the multiple liquid containers contains the liquid having the identical color of a new version, the output unit outputs information prompting a liquid substitution operation in a liquid channel when an initial filling flag is False, and the liquid discharge apparatus executes an ink filling operation or the output unit outputs information prompting an ink filling operation when the initial filling flag is True.

According to a seventh aspect (Aspect 7), in the liquid discharge apparatus according to any one of the first aspect (Aspect 1) to sixth aspect (Aspect 6), the output unit outputs information indicating a state change of the version of the liquid having the identical color contained in the multiple liquid containers before and after exchange.

According to an eighth aspect (Aspect 8), in the liquid discharge apparatus according to any one of the fifth aspect (Aspect 5) to the seventh aspect (Aspect 7), the output unit outputs a manual of the liquid substitution operation, and the manual output of the liquid substitution operation includes a recommended level of filling of a cleaning liquid corresponding to the version of the liquid having the identical color contained in the multiple liquid containers before exchange.

According to a ninth aspect (Aspect 9), in the liquid discharge apparatus of the eighth aspect (Aspect 8), the liquid having the identical color contained in the multiple liquid containers is a white ink, a recommended level of filling of the cleaning liquid is a filling amount of a cleaning liquid corresponding to the version of the white ink, and the filling amount of the cleaning liquid is larger in the white ink of an old version than in the white ink of a new version.

According to a tenth aspect (Aspect 10), a liquid exchange method executed by a liquid discharge apparatus, the liquid exchange method including:

acquiring information on multiple liquid containers that is respectively inserted into multiple insertion ports and contains a liquid having an identical color to each other; and outputting (S13, S30) information prompting exchange of the liquid containers so as to unify the multiple liquid containers into the multiple liquid containers containing the liquid having the identical color of an identical version to each other, in a case where it is detected based on the information on the multiple liquid containers that the multiple liquid containers contains the liquid having the identical color of different versions from each other.

According to an eleventh aspect (Aspect 11), a program to be executed by a computer of a liquid discharge apparatus, the program including:

acquiring information on multiple liquid containers that is respectively inserted into multiple insertion ports and contains a liquid having an identical color to each other; and outputting (S13, S30) information prompting exchange of the liquid containers so as to unify the multiple liquid containers into the multiple liquid containers containing the liquid having the identical color of an identical version to each other, in a case where it is detected based on the information on the multiple liquid containers that the multiple liquid containers contains the liquid having the identical color of different versions from each other.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium may also include a storage medium for storing processor readable code such as a floppy disk, a hard disk, a compact disc read-only memory (CD-ROM), a magnetic tape device, or a solid state memory device.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge apparatus comprising:

a discharge unit to discharge a liquid;

multiple liquid containers to contain the liquid having an identical color to each other;

multiple insertion ports to which the multiple liquid containers are respectively detachably attachable;

an acquisition unit to acquire information of the multiple liquid containers attached to the multiple insertion ports;

a display; and circuitry configured to:

in response to an acquisition of the information of the multiple liquid containers containing the liquid of identical color of different versions by the acquisition unit, cause the display to display information prompting an exchange of a liquid container containing the different versions to a liquid container containing the liquid having an identical color of an identical version to other of the multiple liquid containers.

2. The liquid discharge apparatus according to claim 1, wherein the circuitry is further configured to:

in response to acquisition of the information of the multiple liquid containers containing the liquid having the identical color of different versions of old version and new version, cause the display to display information prompting an exchange of the liquid container containing the different versions to the liquid container containing the liquid having an identical color of a new version.

3. The liquid discharge apparatus according to claim 1 or 2, wherein the circuitry is further configured to:

in response to acquisition of the information of the multiple liquid containers each containing the liquid having the identical color of an identical old version, cause the display to display information prompting an exchange of the liquid container containing the identical old versions to the liquid container containing the liquid having an identical color of a new version.

4. The liquid discharge apparatus according to claim 1 or 2, wherein the circuitry is further configured to:

in response to a detachment of at least one of the multiple liquid containers from the insertion port after displaying the information prompting exchange of the multiple liquid containers, return an exchange operation to exchange the multiple liquid containers to a state before the exchange operation.

5. The liquid discharge apparatus according to claim 1 or 2, wherein the circuitry is further configured to:

in response to acquisition of the information of the multiple liquid containers each containing the liquid having the identical color of an identical new version, cause the display to display information prompting a liquid substitution operation to substitute the liquid in a liquid channel.

6. The liquid discharge apparatus according to claim 1 or 2, wherein the circuitry is further configured to:

in response to an acquisition of information in which all of the multiple liquid containers contains the liquid having the identical color of a new version, display information prompting a liquid substitution operation to substitute the liquid in a liquid channel in a state in which the liquid is filled in the liquid discharge apparatus; and execute an ink filling operation or display information prompting the ink filling operation in a state in which the liquid is not filled in the liquid discharge apparatus.

7. The liquid discharge apparatus according to claim 5, wherein the circuitry is further configured to cause the display to display information indicating a change of the version of the liquid having the identical color in each of the multiple liquid containers before and after an exchange operation to exchange the multiple liquid containers.

8. The liquid discharge apparatus according to claim 5, wherein the circuitry cause the display to display a manual of the liquid substitution operation, and the display displays a filling amount of a cleaning liquid to be filled into the discharge unit corresponding to the version of the liquid having the identical color in the multiple liquid containers before the exchange of the liquid container in the manual.

9. The liquid discharge apparatus according to claim 8, wherein each of the multiple liquid containers contains the white ink having the identical color, the circuitry is further configured to set the filling amount of the cleaning liquid for the white ink of an old version to be larger than the filling amount of the cleaning liquid for the white ink of a new version.

10. A liquid discharge method comprising:

discharging a liquid;

acquiring information of multiple liquid containers each containing a liquid having an identical color to each other; and in response to an acquisition of the information of the multiple liquid containers containing the liquid of identical color of different versions by the acquiring, displaying information prompting an exchange of a liquid container containing the different versions to a liquid container containing the liquid having an identical color of an identical version to other of the multiple liquid containers.

11. A non-transitory recording medium storing program codes which, when executed by one or more processors, cause the one or more processors to perform a method, the method comprising:

discharging a liquid;

acquiring information of multiple liquid containers each containing a liquid having an identical color to each other; and in response to an acquisition of the information of the multiple liquid containers containing the liquid of identical color of different versions by the acquiring, displaying information prompting an exchange of a liquid container containing the different versions to a liquid container containing the liquid having an identical color of an identical version to other of the multiple liquid containers.

* * * * *